Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 1

INVENTOR:
Harold T. Avery
BY Howard M. Dustin
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 2

INVENTOR:
Harold T. Avery

BY Howard M. Dustin
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 3

INVENTOR:
Harold T. Avery

BY Howard M. Dustin
AGENT

INVENTOR:
Harold T. Avery
BY
Howard M. Dustin
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 5

INVENTOR:
Harold T. Avery
BY
Howard M. Duston
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 6

INVENTOR:
Harold T. Avery

BY

Howard M. Dustin
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 7

INVENTOR:
Harold T. Avery

BY Howard M. Dustin
AGENT

INVENTOR:
Harold T. Avery
BY
Howard M. Dustin
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 9

INVENTOR:
Harold T. Avery

BY Howard M. Dustin

AGENT

INVENTOR:
Harold T. Avery
BY
Howard M. Dustin
AGENT

INVENTOR:
Harold T. Avery
BY
Howard M. Dustin
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 12

INVENTOR:
Harold T. Avery
BY Howard M. Dustin
AGENT

Sept. 14, 1954 H. T. AVERY 2,689,085

DIVISION MECHANISM-PRE-ESTIMATION OF QUOTIENT DIGITS BY DIVIDEND-DIVISOR COMPARISON

Filed April 24, 1950 13 Sheets-Sheet 13

INVENTOR:
Harold T. Avery
BY
Howard M. Dustin
AGENT

Patented Sept. 14, 1954 2,689,085

UNITED STATES PATENT OFFICE 2,689,085

DIVISION MECHANISM-PRE-ESTIMATION OF QUOTIENT DIGITS BY DIVIDEND-DIVISOR COMPARISON

Harold T. Avery, Oakland, Calif., assignor to Marchant Calculators, Inc., a corporation of California Application April 24, 1950, Serial No. 157,818

10 Claims. (Cl. 235—79)

The present invention relates to calculating machines and particularly concerns pre-estimation short-cut division mechanisms. The pre-estimation mechanism of the present invention is capable of comparing the divisor with either the true (positive) value of the dividend remainder or the complemental (negative) value thereof, and on the basis of such comparison, automatically estimates the corresponding value of the current quotient digit to substantially the nearest full integer; and in accordance with well known principles of short-cut calculations the quotient digit thus estimated is registered by substantially the minimum number of plus or minus operations of the numeral wheel actators.

The machine in which the present invention is embodied, is disclosed in application Serial Number 12,232, filed March 15, 1948, now Patent No. 2,567,120, issued September 4, 1951, and the machine of that patent is characterized by mechanism which makes it possible to effect and complete a shifting operation during the operation of the numeral wheel actuators in multiplication calculations. In performing division calculations on that machine, however, it is necessary to delay the shift until the machine has determined whether or not an overdraft has occurred; whereas, according to the present invention, comparison on the basis of true and complemental values and the registration of the estimated quotient digits by selective plus or minus operations, make it possible to take full advantage of the simultaneous shift and actuation feature in division as well as multiplication.

The present invention is therefore based upon the principle of comparing a divisor with either the true or complemental value of a dividend remainder, estimating a corresponding quotient digit, and registering the same by substantially a minimum number of plus or minus machine cycles.

A primary object of the present invention is, therefore, to obtain the quotient of a division problem in substantially the minimum number of cycles of machine operation.

Another object is to compare the divisor with the negative or complemental value of the dividend remainder and estimate the corresponding quotient digit, to thereby control registration of said digit by the short-cut method.

Still another object is to sense the value and sign of the dividend, or remainder thereof, and in accordance with said sign to selectively enable one of two pre-estimating devices to compare either a positive or negative remainder value with the divisor and thus obtain the value and sign of the corresponding quotient digit.

Another object is to determine the value standing in a crawl carry register by sensing the rotated position of one or more ordinal value representing members and to eliminate the effect of any backlash in the crawl carry register upon the determination of said value.

A still further object is to shift the divisor storage mechanism relative to the dividend register during an ordinal division operation involving either positive or negative registration of the numeral wheels, and to initiate the succeeding ordinal division operation upon conclusion of such registration.

Other objects and advantages will become apparent from the following detailed description of the invention, in which.

Figure 21:
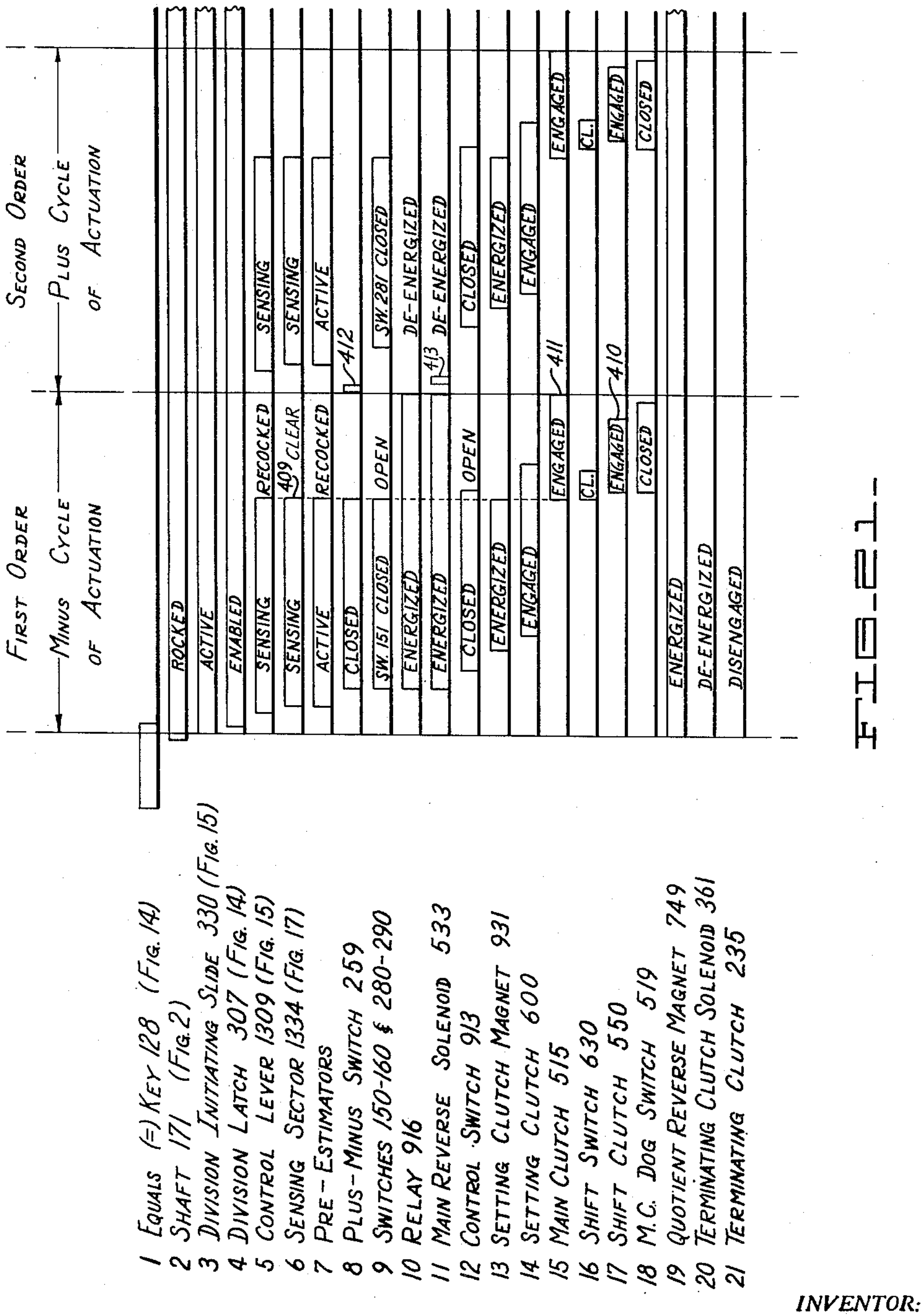
Figure 21A:
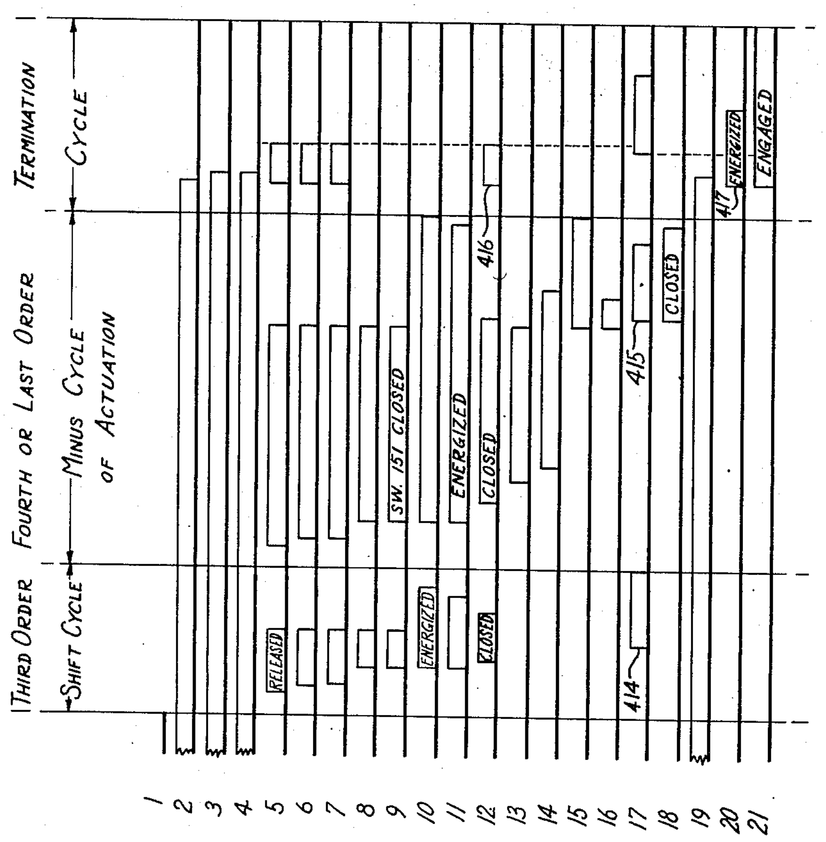

Figs. 21 and 21A form a timing diagram showing the sequential operation of the division mechanisms during the performance of a typical division problem.

GENERAL DESCRIPTION

The machine of the aforementioned Patent No. 2,567,120 includes a plurality of ordinally arranged differential actuators, one permanently associated with each respective ordinal numeral wheel of the accumulator register so that there is no need for causing relative shifting between the actuators and accumulator in order to effect the entry of values into various orders of the accumulator.

A shiftable numeral value storage mechanism, having a lesser number of orders than there are ordinal actuators, is set by the numeral keys of the keyboard, and in turn, sets the ordinal actuators with which it is aligned so that the actuators drive the numeral wheels by the amounts set in the respective orders of the value storage mechanism. The setting of the actuators in each order is maintained throughout an ordinal registering operation, and during such operation the storage mechanism may be shifted to its next ordinal position in preparation for resetting the actuators at the beginning of the next registering operation. The shifting of the storage mechanism does not affect the last setting of the actuators; therefore, a shifting operation occurs during the registering operation without delaying the successive operations of the actuating mechanism.

The division mechanism of the present invention is so arranged that at the end of a registering operation in one order, the machine immediately starts the succeeding ordinal division operation without any delay for shifting of the storage mechanism to change the ordinal relation of the divisor to the dividend.

In performing a division problem the dividend is first entered into a factor indicator 102 (Fig. 1) by depressing the numeral keys 110–119. The dividend entry (÷) key 126 is then depressed to transfer the selected dividend value from the indicator 102 into the dividend register 100 and also to effect clearance of the factor indicator 102. The divisor is then entered into indicator 102 by depressing the corresponding numeral keys, and upon depression of the division start or equals (=) key 128, automatic division is initiated, during which the dividend and divisor values are compared by the mechanism which comprises a part of the present invention, to estimate and then register the quotient in register 101.

ENTRY MECHANISM

Figure 1:
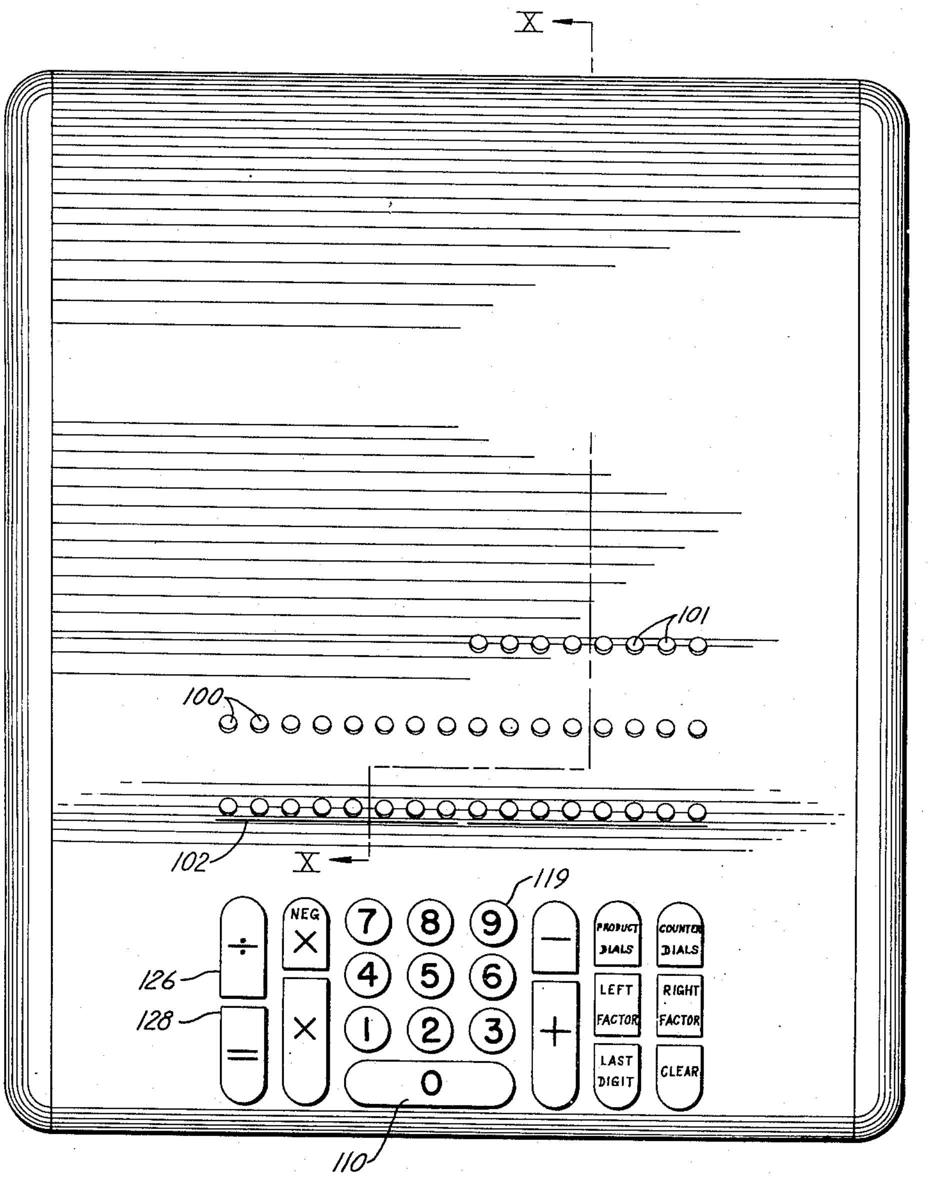
Fig. 1 is an exterior plan view of the calculating machine embodying the present invention.
Figure 10:
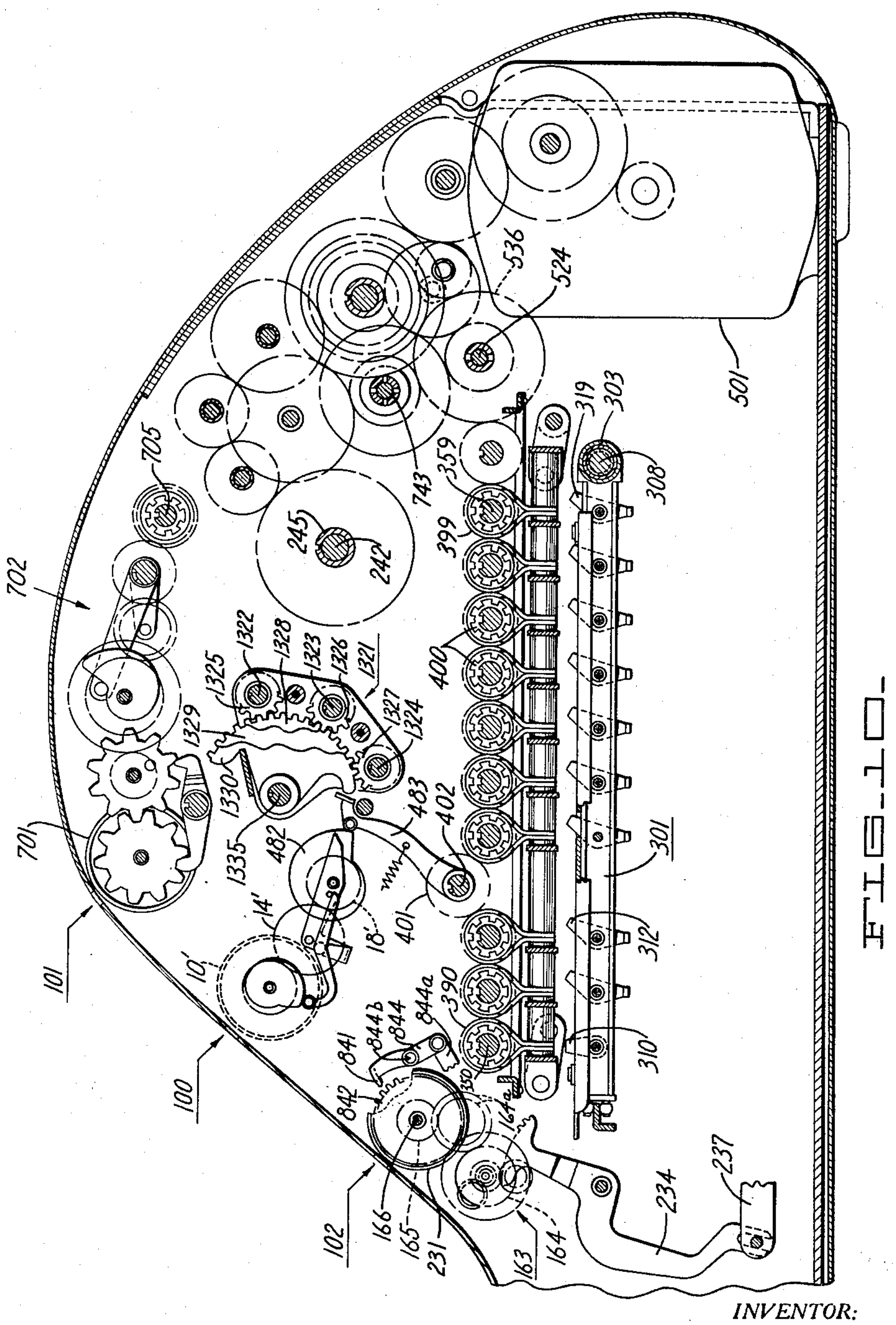
Fig. 10 is a right side view, partly in section, taken along line X—X in Fig. 1 showing the general arrangement of some of the component parts of the machine.

The entry mechanism includes a shiftable multi-order value storing carriage 301 (Fig. 10) which receives and stores the values entered by the depression of the numeral keys 110–119 (Fig. 1). Such entries are made from left to right beginning with the leftmost order of factor indicator 102. One order of the storing carriage 301 is shown in Fig. 10 and which order comprises ten blocking levers 310–319.

Depression of a numeral value key rocks a respective one of the blocking levers 310–319 counterclockwise, where it remains throughout the division operation. Concurrent with such movement of a blocking lever, a respective ordinal numeral wheel 231 of the factor indicator 102 is rotated to a position to show the value selected in that order. The numeral keys are successively depressed until the entry of a factor is completed at which time the factor indicator 102 shows the value entered, and respective ones of the ordinal rows of blocking levers 310–319 are rocked to positions in which they later effect engagement of respective numeral wheel clutches, described hereinafter.

Reference may be had to the previously mentioned patent for a complete description of the mechanism for entering a value into the factor indicator 102 and the storing carriage 301.

NUMERAL WHEEL ACTUATORS

There is a row of ten numeral wheel clutches 400 (Fig. 10) for each dividend register numeral wheel 10' and the above mentioned blocking levers are each effective to control the engagement of a respective one of these clutches. The drive element of each clutch 400 is fixed on a respective drive shaft 350–359, each of which is rotated a different amount during each cycle of operation of a main clutch described hereinafter. When a numeral wheel clutch 400 is engaged, it transmits a respective differential drive to an associated numeral wheel 10' of the dividend register. For this purpose the driven element of each clutch carries a respective gear 390–399 (Figs. 10 and 11), and each ordinal series of gears 390–399 is enmeshed to form an idler gear train. Entrained with the idler gear train is a drive receiving gear 401 journaled on a shaft 402. The drive from gear 401 is transmitted to an associated numeral wheel 10' through a crawl carry gearing 20 (Fig. 11) described hereinafter.

During multi-order operations such as division, which require changing the ordinal relationship between the divisor factor and the dividend or its remainder, the storing carriage 301 (Fig. 10) is shifted one order toward the right during each ordinal actuating operation to associate the divisor factor set therein with the successively lower orders of the numeral wheel clutches 400.

The storing carriage 301 carries a worm nut 303 (Fig. 10) which is driven by a worm shaft 308. This shaft is rotated by a shift clutch described hereinafter to cause ordinal shifting of the storing carriage. During such shifting movement each previously engaged numeral wheel clutch 400 is adapted to be held in engaged position, so that numeral wheel actuation is not affected by the shift of the storing carriage, all as is fully described in said patent.

From the foregoing description of the entry mechanism and numeral wheel actuators, it will be apparent that the provision of the same or substantially the same number of orders in the actuating mechanism as there are orders in the accumulator, together with the provision of a multi-order carriage which receives and stores a multi-order factor and which is shiftable ordinally relative to the actuators, makes it possible to set a factor into any group of orders of said actuating means. Since the engagement of the numeral wheel clutches 400 is maintained during an actuating operation, the storing carriage may be shifted into its next ordinal position during such operation; therefore, successive ordinal operations of the actuators may be effected without any delay for the ordinal shift.

DIVIDEND REGISTER

The dividend register 100 (Figs. 1, 10 and 11) is of the crawl carry type disclosed in the patent application Serial Number 77,350, filed February 19, 1949, now Patent No. 2,622,805, issued December 23, 1952. Each numeral wheel 10' (Fig. 11) of this register is advanced by a respective planetary gearing generally indicated at 20 and which planetary comprises a digital input gear 21', an internal ring gear 26, a tens carry input gear 22', and a summation gear 18'. The summation gear 18' is advanced in accordance with the sum of the digital and tens carry increments entered through gears 21', 26, and 22' and drives the numeral wheel 10' through a rockable idler 14'.

At the end of a calculation the idler gear 14' is rocked clockwise a selective amount in the manner described in the last mentioned Patent No. 2,622,805 to back out partial carry increments and thus align the numeral wheel in a full digital position.

The register 100 differs from conventional crawl carry registers in that the aligning movement of a numeral wheel 10' is accomplished without moving the summation gear 18' of the differential 20. The snail cam 482 (Fig. 10) which is integral with gear 18', thus stands in the crawl position regardless of the aligning movement of the respective numeral wheel. The rotated position of any snail cam 482 therefore may be sensed previous to or during the aligning of the numeral wheels to determine the value standing in the dividend register 100 without the aligning movement affecting the value sensed. In the machine of the present invention, a divided sensing occurs previous to each pre-estimation operation, and is effective to adjust the quotient pre-estimating mechanism in accordance with the values sensed.

The dividend sensing mechanism includes a plurality of follower levers 483 (Fig. 10) each of which is adapted to rock counterclockwise and contact the graduated periphery of a respective snail cam 482. The rocked position of a lever 483 is then sensed by means described hereinafter to determine the value standing in that order. Levers 483 are keyed for limited angular movement on the shaft 402, and during the sensing operation they are spring urged into contact with their aligned snail cams 482.

During an actuating operation, the levers 483 must be held clear of their respective snail cams to prevent interference between the levers and the rotated cams. This is accomplished as follows. A cam 618 (Fig. 11), driven by a setting clutch, described hereinafter, operates previous to each actuation and rocks a follower lever 488 clockwise about pivot 489. The upper arm of lever 488 is pivotally connected to the right end of a link 487. At its left end, link 487 is pivotally connected to a lever 484 which is secured to shaft 402. The follower levers 483 (Fig. 10), as previously mentioned, are loosely keyed to this same shaft 402. The clockwise movement imparted to follower 488 (Fig. 11) rocks shaft 402 clockwise sufficiently to move the follower levers 483 out of the paths of their snail cams 482 and levers 483 are locked in this position throughout the actuating operation as follows.

A latch 491 (Fig. 11) is freely mounted on shaft 492 and is held in the clockwise position shown by the contact of an arm 494 with a pin 491*a* on the latch 491. Arm 494 is fixed to a shaft 508 which carries a main clutch control dog 516. During the setting clutch cycle a setting clutch cam 613 and a follower 631 rock the shaft 508 clockwise to cause engagement of a main clutch 515 described hereinafter. This clockwise movement of shaft 508 also rocks arm 494 clockwise thus permitting the latch 491 to be rocked counterclockwise by its spring and engage ear 488*a* on follower lever 488, which has previously been rocked to a clockwise position by cam 618. The latch lever 491 holds the follower lever 488 in its clockwise position as long as the main clutch dog 516 is held in clutch engaging position. The setting clutch completes its cycle of operation and is disengaged during the first cycle of operation of the main clutch, but such disengagement does not affect the above described latch lever 491. In this manner shaft 402 is rocked clockwise and the follower levers 483 (Fig. 10) are held in positions away from the snail cams 482 throughout the actuating operation and until the main clutch dog rocks to clutch disengaging position. At such time the arm 494 (Fig. 11) on shaft 402 removes the latch 491 from a restraining engagement with ear 488*a*, thus permitting the counterclockwise movement of lever 488 and the return of the follower levers 483 (Fig. 10) to engage the peripheries of their respective snail cams 482.

The above mentioned clockwise movement of shaft 402 is also effective through the connecting linkage comprising arm 748, link 750, lever 751, link 752, and arm 753, to move the ordinal numeral wheel centralizer pawls 30' and 755 of the dividend and quotient registers respectively out of engagement with gears 20' and 418. In this manner the pawls are held in disengaged position throughout the operation of the main clutch and are released from disengaged positions at the end of an actuating operation to centralize their respective numeral wheels 10' and 701 at the same time the follower levers 483 are released to contact the snail cams 482.

QUOTIENT REGISTER

The quotient register 101 (Figs. 1 and 11) is of the crawl carry type disclosed in the aforementioned Patent No. 2,567,120, and with the exception of the manner in which the numeral wheels are aligned it is generally similar to the accumulator or dividend register 100.

The register 101 includes the numeral wheels 701 (Fig. 11), each of which is driven by a respective drive gear 703 through a planetary gear train generally indicated at 702. Each gear 703 is driven by a respective ordinal clutch 700 similar to the ordinal clutches 400 of the actuating mechanism for the dividend register, there being only one clutch 700 for each order of the counter register in contrast to the plurality of clutches 400 for each order of the dividend register.

A shiftable interponent 716, which is similar in operation to the blocking levers 310–319 (Fig. 10) of the storing carriage 301, is provided to cause engagement of one of the ordinal counter numeral wheel clutches 700 (Fig. 11) as described in said patent. The arrangement is such that engagement of a clutch 700 causes a single count to be entered into an order of the counter register during each cycle of operation of the actuating mechanism.

The interponent 716 has a driving engagement with a worm shaft 718 for shifting of the interponent from one order of the quotient register to the next so that successive clutches 700 may be engaged. Such engagement causes successive numeral wheels 701 to count the number of times the multi-order divisor factor is added to or subtracted from the dividend numeral wheels and thereby register the quotient digits.

For a more detailed description of the quotient register and the manner in which the numeral wheels thereof are advanced to indicate the quotient, reference may be had to said Patent No. 2,567,120.

MOTOR DRIVE MECHANISM

The motor drive mechanism of the present machine includes an electric motor from which five separate drive trains are provided through a setting clutch, a main clutch, a shift clutch, a terminating clutch and a clear clutch, respectively.

The drive trains to the setting clutch, the main clutch, the shift clutch and the clear clutch are the same as described in the last mentioned patent; whereas, the drive to the terminating clutch is described hereinafter. It will be noted with reference to Fig. 20, that the movement of any one of the respective clutch control dogs for these five clutches to clutch engaging position is effective to close a respective switch in a corresponding circuit from the main line 911 and lead 291 to the motor 501. The motor circuit remains closed until the respective clutch dog moves to clutch disengaging position.

The above mentioned clutches and the respective cams and the associated mechanisms driven by these clutches are designated in the specification and in the drawings as follows: S. C. for setting clutch, M. C. main clutch, Sh. C. for shift clutch, C. C. for clear clutch, and T. C. for terminating clutch.

*Setting clutch*

The setting clutch (not shown) operates, as described in the last mentioned patent, to drive a sleeve 612 (Fig. 11) which has various cams fixed thereto including the previously mentioned cams 613 and 618. A setting clutch cam 619, shown diagramatically in Fig. 20, closes a switch 630 in the circuit of a shift clutch solenoid 559 to cause energization of that solenoid. Each energization of the shift solenoid initiates a shifting operation, as described in said patent.

Two setting clutch cams (not shown) are provided in the present machine to cause engagement and disengagement respectively, of the numeral wheel clutches 400 (Fig. 10) in accordance with the setting of the previously mentioned blocking levers 310–319. Another setting clutch cam is provided to condition a control mechanism for the actuating mechanism. These three cams are identified by the reference numerals 615, 616 and 617 in said Patent No. 2,567,120 and while not shown in the present application it will be understood that they perform the same functions as described in that patent.

*Shift clutch*

The shift clutch 550 (Fig. 17) operates to effect ordinal shifting movement of some of the component parts of the machine including the selection storing carriage 301 (Fig. 10) and the ordinal counter control interponent 716 (Fig. 11) as well as various shiftable elements of the division control mechanism, described hereinafter. The shift clutch 550 (Fig. 17) is a half revolution clutch and corresponds to the clutch of the same reference numeral in the last mentioned patent. Each cycle of operation of the half-revolution shift clutch drives a sleeve 563*a* (Fig. 17) and its two cams 565 (Fig. 15) and 567 (Fig. 17) a full revolution.

Cam 567 forms a part of the main shift drive train of the machine and, with other associated mechanisms, serves to advance the shiftable parts of the machine one step for each cycle of the shift clutch, while cam 565 serves to restore the dividend sensing mechanism to its initial non-sensing position.

Figures 11, 11A:
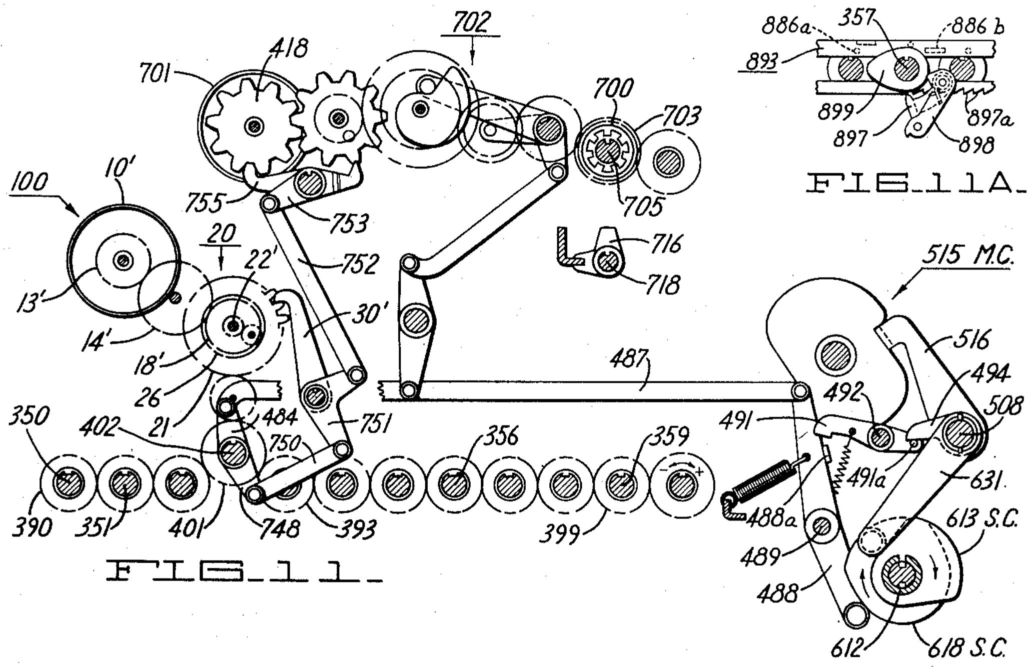
Fig. 11 is a right side view, partly in section, showing the main clutch and the control mechanism for the centralizer pawls of the dividend and quotient registers.
Fig. 11A is a sectional view as seen from the right side of the machine showing a portion of the main clutch control mechanism.

Cam 567 operates through a follower 568 (Fig. 18) and an actuating pawl 569 to advance a shift ratchet 571 one step counterclockwise for each cycle of the shift clutch. A pawl 572 engages successive teeth of ratchet 571 to hold the latter in its advanced positions. Each time the ratchet 571 is advanced one step, various ordinally shiftable elements of the machine are shifted one order. These elements include the selection storing carriage 301 (Fig. 10), shiftable by means of the worm shaft 308, (Fig. 10) and the counter actuating means interponent 716 (Fig. 11) shiftable by means of the worm shaft 718 (Fig. 11). The shift drive to the worm shafts 308 and 718 is transmitted from ratchet 571 (Fig. 18) by respective gear trains described in detail in the last mentioned patent. A drive from ratchet 571 is also transmitted to shaft 1335 (Figs. 10 and 16) to effect shifting of a dividend sensing carriage 1321, described hereinafter.

In the last order of division the shift clutch becomes engaged in the usual manner, either concurrently with the actuating operation or as a result of a "0" quotient estimation. The selection storing carriage and the counter interponent must not be shifted beyond their last ordinal positions of alignment with their respective ordinal actuators, however, since the last ordinal estimation and actuation may leave a negative remainder in the dividend register in which case a corrective plus stroke must be initiated by the terminating mechanism. The shift ratchet 571 (Fig. 18) therefore carries a deflector plate 344 which, in the advanced position shown in Fig. 18A, deflects the actuating pawl 569 to prevent further advance of ratchet 571 during the additional shift clutch cycle. This deflector plate also serves to prevent advance of the ratchet 571 during the terminating clutch cycle in those cases where a corrective plus stroke and concurrent shifting operation is initiated.

Figures 17, 18, 18A, 19, 19A:
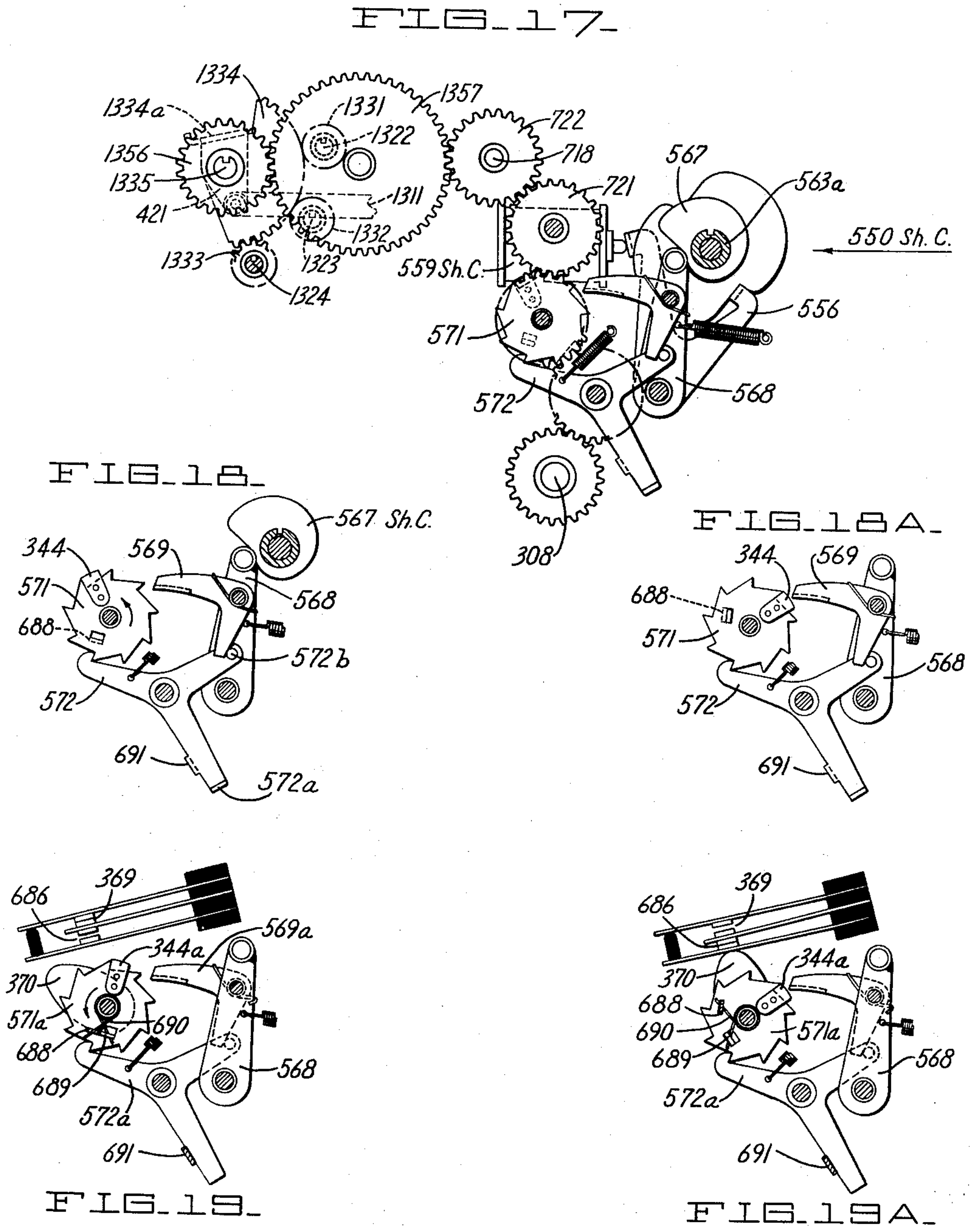
Fig. 17 is a right side view of the shift clutch and the drive train for shifting the dividend sensing carriage and the divisor storing carriage.
Fig. 18 is a detailed right side view of part of the shift drive train shown in Fig. 17.
Fig. 18A is a detailed right side view showing the mechanism which is operable in the last order of division to disable the shift drive train.
Figs. 19 and 19A is a right side view of the mechanism for controlling a switch that cuts in the pre-estimation circuit and cuts out the terminating clutch solenoid, and vice versa.

The follower arm 568 (Fig. 19) carries a second actuating pawl 569*a* which advances a second ratchet 571*a* in much the same manner as the actuating pawl 569 advances ratchet 571 (Fig. 18). Ratchet 571*a* is fixed to a cam 370 which, in the position of the ratchet and cam shown in Fig. 19A, is effective to open switch 686 (Fig. 20) in the pre-estimation control circuit and to close switch 369 in the circuit of a terminating clutch solenoid 361. Ratchet 571a and its cam 370 (Figs. 19 and 19A), however, are arranged to be advanced one step more than ratchet 571 before closing switch 369 and opening switch 686. After such an additional step of advance, the ratchet 571a is blocked from further operation by the shift clutch and the actuating pawl 569a, in order to hold switch 369 closed and switch 686 open. The ratchet 571a is therefore provided with a deflector plate 344a similar in all respects to plate 344, except that plate 344a is so located as to lag one step behind the plate 344 and to block advance of ratchet 571a one shift clutch cycle later than that in which ratchet 571 is blocked.

The ratchets 571 and 571a are yieldably connected so that when the ratchet 571 is returned to its initial position by the clear clutch as described hereinafter, the ratchet 571a will likewise be returned to its initial position. An ear 688 (Fig. 18) on ratchet 571 lies adjacent an ear 689 (Fig. 19) on ratchet 571 and a torsion spring 690 passes through each ear and around the shaft as shown in Figs. 19 and 19A to urge the two ears against each other. When the ratchet 571a is advanced one step farther than the ratchet 571 the torsion spring 690 yields and the parts assume the respective positions shown in Figs. 18A and 19A.

During a clearance operation, described in the previously mentioned Patent No. 2,567,120, a clearance control member (not shown) contacts ear 572a (Figs. 18 and 18A) of the holding pawl 572 and rocks the latter counterclockwise out of restraining engagement with ratchet 571. At the same time a pin 572b on a third arm of the holding pawl 572 rocks the actuating pawl 569 out of the path of the ratchet 571. The latter thereupon is rotated clockwise by spring means disclosed in said patent to drive the shift train in the opposite direction from which it is advanced by the shift clutch and to return the members previously shifted by said clutch back to their initial positions.

In the present invention a new ear 691 is provided on the holding pawl 572 and which ear is adapted to rock the holding pawl 572a (Fig. 19) counterclockwise. This releases ratchet 571a from the holding pawl 572a and permits it to follow the ratchet 571 and return to the initial position shown in Fig. 19.

*Main clutch*

The main clutch 515 (Fig. 11) drives through a suitable train of gears described in the previously mentioned Patent No. 2,567,120 to rotate the differential actuator shafts 351–359 (Figs. 10 and 11) by amounts proportionate to the values "1" to "9." Shaft 350 is the "0" shaft and is locked against rotation to prevent driving of the dividend register numeral wheels in those orders where a "0" has been selected.

The main clutch also serves through a suitable drive train, shown in said patent to drive the ordinal gears 703 (Fig. 11) through one of the quotient numeral wheel clutches 700 and enter a single increment of count into a selected order of the quotient register 101 during each cycle of operation of the main clutch.

The clutch control dog 516 (Fig. 11) for the main clutch 515 is rocked to clutch-engaging position by the setting clutch cam 613 previously mentioned, and is held in clutch-engaging position by a latch (not shown). The latch and its related control devices, which are all fully described in the last mentioned patent, are operable to hold the main clutch dog in engaged position for a predetermined number of cycles of operation of the main clutch. Such operation of the latch is under the control of a series of electromagnets described hereinafter to cause disengagement of the main clutch after selective operation thereof through one to ten cycles.

*Drive Reverse mechanism*

A main reverse drive unit is selectively operable to reverse the direction of rotation of shaft 524 (Fig. 10) and thereby reverse the drive from the main clutch to the actuator shafts 351–359 for the clutches 400 and also to reverse the drive to the drive shaft 705 (Fig. 11) for the clutches 700 of the quotient register. The direction of rotation of shaft 524 is under control of a M. R., main reverse, solenoid 533, diagrammatically illustrated in Fig. 20. When the solenoid is de-energized the machine is conditioned for positive actuation of the dividend numeral wheels and when it is energized the machine is conditioned for negative actuation, as described in the above mentioned patent. A second drive reverse unit is operable in the division operations under the control of a quotient reverse solenoid 749 (Fig. 20) to reverse the drive from the above mentioned shaft 524 (Fig. 10) to the counter register drive shaft 705 and thereby effect a positive count of the number of negative cycles of operation of the main clutch or vice versa. The above mentioned drive reverse units are conventional and reference may be had to the above mentioned patent for a description of parts not specifically described herein. The respective controls for these reverse units are more fully described in the section on division operations.

*Clear clutch*

A clear clutch is provided to zeroize the numeral wheels in all or selected ones of the registers and indicators by operation of the various clear keys (Fig. 1) and the mechanisms controlled thereby. The clear clutch is also engaged as a result of a dividend entry operation to return the selection storing carriage 301 (Fig. 10) and related selection mechanisms to their initial positions and also to clear the storing carriage of any value set therein, all as is fully described in the Patent No. 2,567,120.

*Terminating clutch*

After the last ordinal division operation a single cycle terminating clutch 235 (Fig. 14) is automatically engaged as described hereinafter and performs two functions: (1) it causes selective initiation of a plus stroke in case the dividend remainder is a negative (overdrafted) value after the last ordinal division operation and, (2) it drives various cams which normalize the machine in preparation for the next calculation, all as is fully disclosed in a following section on the division mechanism. The drive for the terminating clutch is derived from the electric motor through a gear 236 (Fig. 15) fixed to the main drive sleeve 511, and this drive is transmitted through idler gears 238, 239 and 240 to a gear 241 fixed to shaft 242. This shaft carries a drive ratchet 243 (Fig. 14) for the single cycle terminating clutch 235 and when the clutch is engaged, it drives a tubular shaft 245 and a plurality of cams carried thereby for performing the above terminating operations. Clutch engagement is caused by a terminating clutch solenoid 361 (Figs. 14 and 20) which, upon energization thereof, rocks clutch dog 244 to clutch engaging position, and energization of this solenoid is controlled by mechanism described hereinafter in connection with division operations.

DIVISION MECHANISM

The division mechanism includes means for initiating and automatically carrying out pre-estimation short-cut division operations, and also includes means for terminating the division operation with a positive remainder, if any, in the dividend register.

The means for automatically carrying out the division operation includes a quotient pre-estimating mechanism which is described in the subsection immediately following. The division initiating and terminating mechanisms are described hereinafter.

*Pre-estimating mechanism*

The pre-estimating mechanism of the present invention comprises two pre-estimating devices. The first will be referred to hereinafter as the primary pre-estimator which compares the value of the dividend or remainder thereof with the divisor to estimate the true or positive value of the current quotient digit, and the second will be referred to as the complementary or secondary pre-estimator which compares the complement of an overdrafted or negative remainder value with the divisor to estimate the current quotient digit. These two pre-estimating devices are selectively enabled or disabled in accordance with the sign of the dividend, or remainder. If the sign of the current dividend remainder is positive, then the primary pre-estimator is enabled and it exercises control over the number of minus cycles of operation of the actuating mechanism, while if the sign of the current dividend is negative, then the complementary pre-estimator is enabled to exercise control over the number of plus cycles of the actuators.

Since the primary and complementary pre-estimators are generally similar in mode of operation, only the primary pre-estimator will be described in detail, such description also sufficing for the complementary pre-estimator except for minor differences which are pointed out hereinafter.

Figure 2:
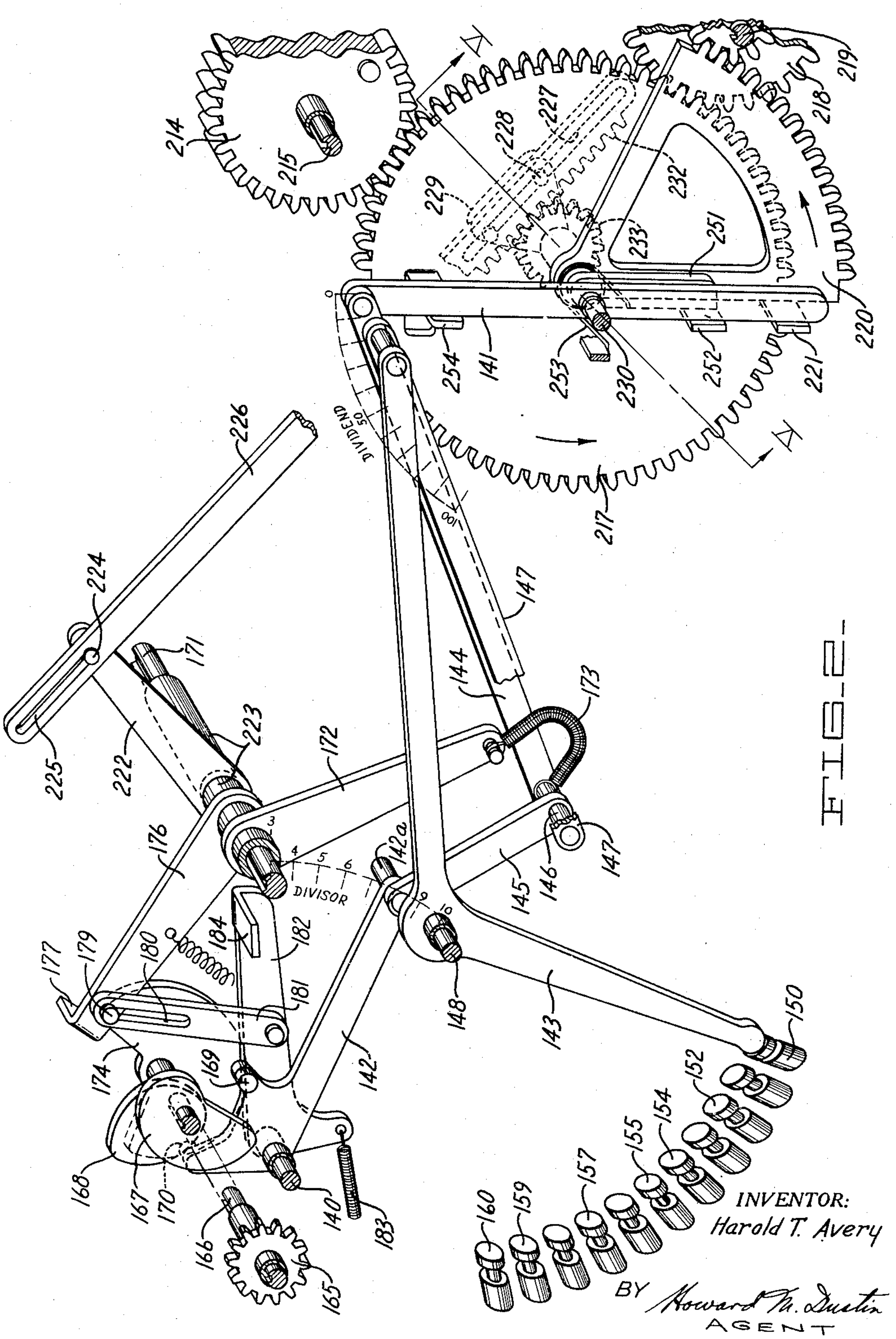
Fig. 2 is an enlarged isometric projection of the primary pre-estimating mechanism as seen from the right rear of the machine.

Briefly, the primary pre-estimator shown in Fig. 2 comprises a dividend lever 141, freely mounted on a shaft 230 and adjusted along a "dividend scale" in accordance with the value of the current dividend, and a divisor lever 142, freely mounted on a stud 140 and adjusted along a "divisor scale" in accordance with the value of the divisor. In the position of the parts shown in Fig. 2 the dividend lever 141 stands at its initial "0" position. The divisor lever 142 on the other hand stands at a position of approximately "8," and assumes this position when the pre-estimation mechanism is disabled because of the force of gravity on the particular form of the linkages shown to illustrate this invention, but when the pre-estimation mechanism is enabled, lever 142 is accurately set along the divisor scale at a position representative of the divisor value, as will presently appear.

The dividend and divisor levers, through connecting linkages, described shortly hereinafter, constrain a quotient bellcrank 143 to selectively close one of a series of eleven quotient switches 150–160 in accordance with the ratio ($Dv/Dr$) of the dividend to the divisor. Usually only one quotient switch is closed at a time, but, in those cases when two adjacent switches are closed, the lower numbered switch controls.

The dividend and divisor levers 141 and 142 jointly control the quotient bellcrank 143 as follows. The dividend and divisor levers have respective depending links 144 and 145 freely pivoted thereto and which links are pivotally connected to one another by a pin 146. A link 147 is also pivotally connected to pin 146 and which link, at its opposite end is freely pivoted to the rightmost end of the quotient bellcrank 143. The latter is freely mounted on a shaft 148 suitably carried by the machine framework. The movements of the dividend and divisor levers along their respective dividend and divisor scales jointly position the pin 146 which, through link 147 constrains bellcrank 143 to move clockwise and close one of the switches 150–160 representative of the ratio $Dv/Dr$.

Figure 4:
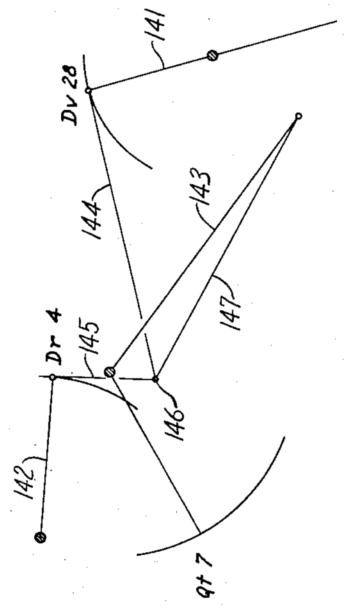
Figs. 3 and 4 are schematic illustrations showing the movements imparted to various parts of the primary pre-estimator during different quotient pre-estimating operations.
Figure 3:
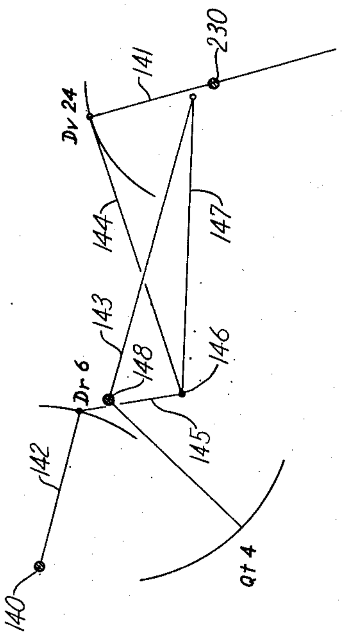

In the schematic illustration shown in Fig. 3, for example, the dividend lever 141 stands at a value of 24 and the divisor lever 142 stands at a value of 6, thus moving respective links 144 and 145, pin 146 and link 147 to positions in which link 147 constrains the quotient bellcrank 143 to close the #4 quotient switch. In Fig. 4 the dividend lever 141 stands at a value of 28 and the divisor lever 142 stands at a value of 4, and in this case the #7 quotient switch is closed.

The depression of the equals (=) key, for starting the division operation, completes a circuit to the quotient switches 150–160 described above in connection with Fig. 2 to enable the one of these switches to control the number of cycles of operation of the actuators. The equals key also initiates operation of the quotient pre-estimating mechanism for closing a selected one of these quotient switches, and furthermore initiates operation of the dividend sign determining mechanism.

The actuation control circuit includes two switches 913 and 1269 (Fig. 20) the closure of which by depression of the equals key, completes said circuit from main line 911, connected to switch 1269, lead 911*a*, switch 913, the normally closed switch 686, and the common lead 692 connected to the quotient switches 150–160. At the same time the above circuit is closed, a sign determining circuit is also closed by the sign determining mechanism. Assuming for purposes of illustration that the sign of the dividend register is positive, then the sensing of a positive value in the dividend register causes a switch 259 (Fig. 20) to remain closed and closes a circuit from lead 911*a* through a solenoid 916 to ground. Energization of solenoid 916 moves the gang switches 790–800 from the upper positions shown to their lower dotted line positions.

Assuming further that a "4" quotient digit is pre-estimated, then the closure of the number "4" quotient switch 154 completes the above circuit from buss 692 through the closed number "4" quotient switch 154, switch leaf 796 (which is in its lower dotted line position) to lead 924, the actuating winding 854*b* of the quotient magnet 854, lead 693, through the setting clutch solenoid 931 and the normally closed switches 519 and 648 to ground. This causes energization of both the quotient magnet 854 and the setting clutch solenoid 931, the latter of which start the operation of the division mechanism described hereinafter.

The mechanism that is controlled by the quotient solenoids for determining the number of actuator cycles is substantially the same as the corresponding mechanism in the above mentioned Patent No. 2,567,120, the only difference being that the mechanism in the present application is adjustable to ten different positions under control of the ten quotient solenoids instead of nine positions in said patent. This mechanism includes a slide 893 (Fig. 11A) corresponding to the slide of the same number in said patent, and is set to a position corresponding to the value of the quotient magnet energized. The setting of the slide is determined by a plurality of stops associated with said magnets as disclosed in said patent and is returned to its initial position by a ratchet feeding mechanism including cam 899 and pawl 897. When the slide is fed back to its initial position it becomes effective to cause disengagement of the main clutch and stop the actuators after operation thereof through a number of cycles corresponding to the quotient digit estimated.

With the provision of ten actuation control magnets representing the quotient digits "1" to "10," a quotient of 99 may be registered by ten cycles of positive advance of the "tens" order quotient numeral wheel and one negative cycle in the "units order" quotient numeral wheel, i. e. (10 x 10)—1=99. In the absence of the #10 actuation control magnet 860, nine cycles of positive advance would be required in both the "tens" and the "units" orders to obtain a quotient of 99. Obviously, a quotient of 99 may also be obtained by a single digit of advance of the "hundreds" order quotient numeral wheel and a single digit subtraction in the "units" order numeral wheel, i. e. 100—1=99. The present machine, however, has been designed to start division operations with the highest order of the divisor in alignment with the highest order of the dividend, in which case a pre-estimation in the above mentioned "hundreds" order is not practical; therefore the first digit of the quotient is not short cut. In all orders following the first order, however, the quotient is short-cut, and in a quotient of 5099, for example, the last three digits 099 are determined in the short-cut manner, i. e. by a single digit of advance in the "hundreds" order and a single digit subtraction in the "units" order (100—1=99).

*Divisor indicator*

The divisor indicator 102 (Figs. 1 and 10) is provided with planetary gearing between the three highest orders thereof for compounding the digital values standing in these orders. By means of this arrangement it is possible to obtain a single divisor indication which is proportional to the value of the highest order divisor digit plus one-tenth and one-hundredth, respectively of the digital values standing in the second and third highest divisor orders.

The planetary gearing between the three highest divisor orders is generally indicated at 163 in Fig. 10 and corresponds to a planetary gearing of the type disclosed in the Patent No. 2,343,273 issued March 7, 1944, to which reference may be had for a detailed description of the mechanism comprising the present divisor planetary mechanism. A gear 164 is differentially rotated according to the compounded divisor value, and drives through a double idler 164*a* to rotate a gear 165 of the pre-estimation mechanism. Gear 165 (Figs. 10 and 16) is fixed to a shaft 166 upon which the divisor indicator numeral wheels 231 are freely mounted.

It should be noted that the numeral wheels 231 of the divisor indicator always stand in full digital display position since each is rotated by a respective digital input gear of the planetary gearing 163, and which input gear advances the numeral wheel independently of the compounding mechanism as described in the last mentioned patent.

Figures 14, 15:
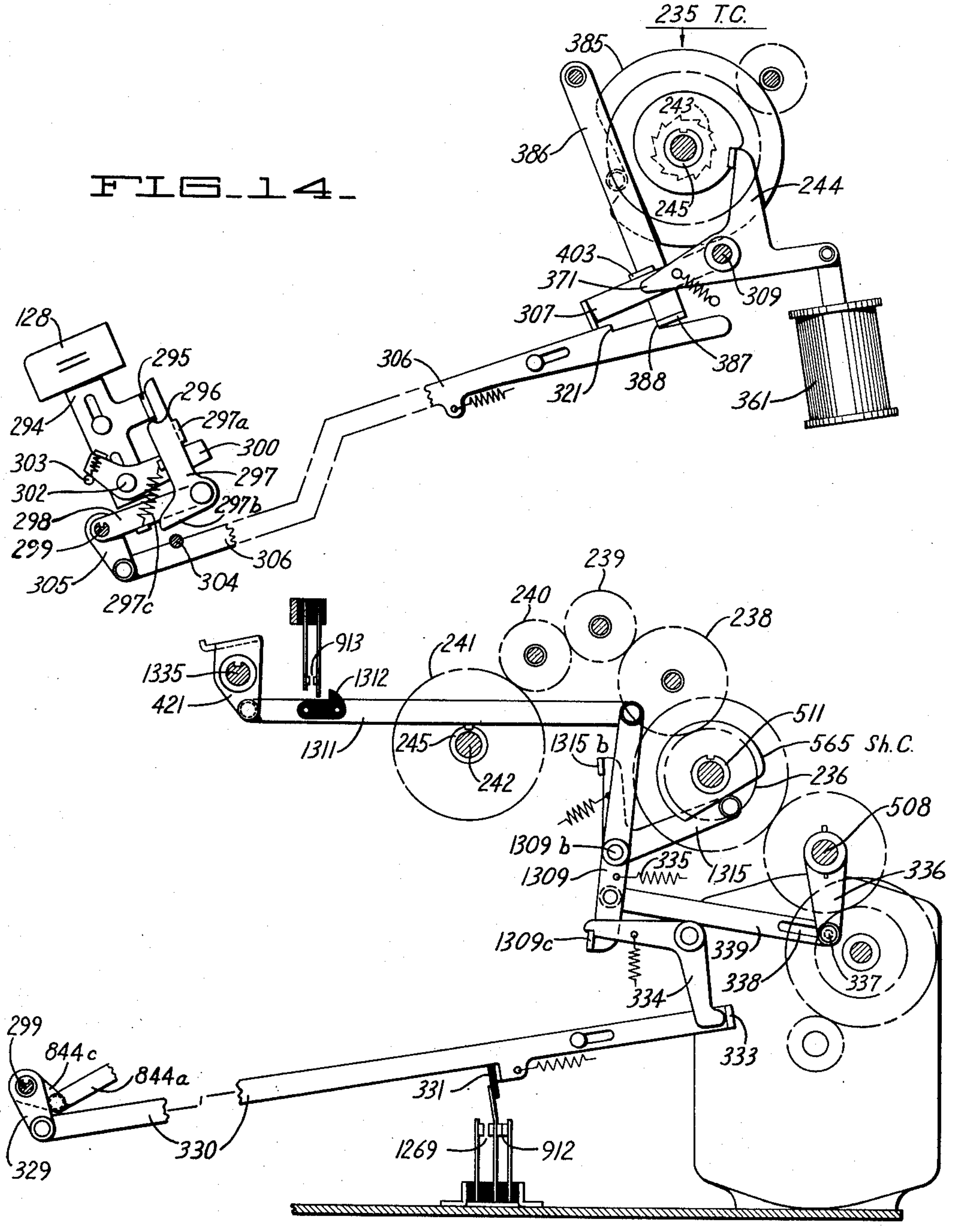
Fig. 14 is a right side view of the divison start key and division terminating mechanisms.
Fig. 15 is a right side view of the mechanism for moving the dividend sensing mechanism into and out of operation.

A gear 842 (Fig. 10) is integral with each numeral wheel 231, and during division operations the gears 842 of the three highest divisor orders are locked against rotation to prevent displacement of the planetary gearing 163 when the value of the divisor is sensed. For this purpose a divisor lock gate 841, similar to one of the same reference numeral in the Patent No. 2,343,273, is provided to engage the teeth of the three highest order gears 842. The lock gate 841 is fixed to shaft 844*b* which is rocked counterclockwise by a lever 844 having connecting linkage 844*a* with a shaft 299 (Fig. 14). This shaft, as described hereinafter, is moved clockwise by depression of the division key and is maintained in clockwise position throughout the division operation. In this manner the divisor lock gate 841 is rocked counterclockwise and the divisor indicator numeral wheels are held locked against rotation throughout the division operation.

*Divisor sensing mechanism*

From preceding sub-section it is seen that shaft 166 (Fig. 10) is rotated a selective amount according to the compounded value of the three highest divisor orders. Cams 167 and 168 (Fig. 2) are fixed to shaft 166 and therefore are rotated in accordance with said compounded divisor value. These two cams are provided for alternatively controlling the setting of the divisor lever 142 along the divisor scale as will presently appear, and for this purpose the divisor lever 142 carries two follower rollers 169 and 170 for alternatively contacting respecting cams 167 and 168.

The movement imparted to the pre-estimating mechanism by the setting of the divisor lever 142 along the divisor scale to a value greater than three is sufficient to render negligible the effect of any inaccuracies or backlash in the pre-estimating mechanism due to manufacturing tolerances. Any such inaccuracy or backlash however, produce a greater error in quotient pre-estimation when smal divisor values are used for comparison; therefore when a divisor value from "1" to "3" is used, both the divisor lever 142 and the dividend lever 141 are set along their respective divisor and dividend scales at values three times the values sensed. In this manner the mechanical movement of the pre-estimation mechanism is increased and the effect of the backlash is decreased without changing the ratio of the dividend to the divisor.

The previously mentioned cam 167 controls the setting of the divisor lever 142 along the divisor scale in accordance with the true divisor value sensed, while the cam 168 controls the setting of the divisor lever along said scale to a position equal to three times the value of the divisor. If the divisor is a value of more than three, lever 142 is rocked counterclockwise until roller 169 contacts cam 167, while if it is a value of three or less, a mechanism is brought into play to rock the lever 142 clockwise until roller 170 contacts cam 168.

The mechanism for selectively rocking the divisor lever 142 either clockwise or counterclockwise includes a trebling control cam 174 (Fig. 2) fixed to shaft 166, and a lever 176 keyed for limited rotation on shaft 171. Lever 176 normally is held in the position shown, with an ear 177 overlying the cut out portion of cam 174 which is shown in its "0" position. When division operations are initiated, shaft 171 and arm 176, are rocked counterclockwise, and if the divisor is a value of more than three the large periphery of the cam underlies ear 177 of lever 176 and prevents any appreciable counterclockwise movement of the latter. At the same time, the counterclockwise rocking of shaft 171 causes the arm 172 to tension the spring 173, and through the link 145, the spring 173 rocks lever 142 counterclockwise until roller 169 contacts cam 167. At this time lever 142 stands at a position along the "divisor" scale representative of the divisor value.

If the divisor is a value of three or less then the cut away portion of cam 174 underlies ear 177 of lever 176, and upon rocking of shaft 171, the lever 176 rocks counterclockwise to contact the small periphery of the cam. Lever 176 has a pin and slot connection 179—180 with a link 181 which is pivotally connected to a lever 182. The latter is urged clockwise by a spring 183 and has an ear 184 overlying lever 142. Upon counterclockwise rocking of arm 176 to contact the small periphery of cam 174, the pin and slot connection 179—180 permits spring 183 to rock lever 182 clockwise, whereupon ear 184 rocks lever 142 clockwise until roller 170 contacts cam 168, the spring 183 at such time overcoming spring 173. The contour of cam 168 is such that lever 142, in this latter example, will be set along the divisor scale at a value approximately three times the true value of the divisor.

If this approximate trebling is arranged to commence at a divisor value of exactly three, the ratio of increase may be in the ratio of 3⅓ to 1 so that the largest value thus increased, which would be a divisor value of 3, when multiplied by the ratio of increase, equals 10. On the other hand, it could be arranged so that all divisor values up to 3⅓ would be increased by a ratio of exactly 3 to 1. Preferably all values up to the square root of 10, which is approximately 3.16, may be increased by a ratio equal to the square root of ten, or approximately 3.16.

It will be noted that the shaft 171 remains in the above described counterclockwise position throughout the division operations and that the divisor lever 142 remains in either of its selectively set positions relative to cams 167 or 168 until a terminating clutch operates through a cam and follower to restore shaft 171 to the normal position shown, all as will be fully described later.

*Dividend sensing mechanism*

The dividend sensing mechanism comprises a shiftable three order sensing carriage 1321 (Figs. 10 and 16) which determines the values standing in the two highest orders of the dividend, or remainder thereof, and also determines the value standing in the next order higher than the highest order of the current dividend. The values standing in two highest current dividend orders are used for setting of the dividend lever of the quotient pre-estimating mechanism in accordance with the value of the dividend, while the value standing in the one order higher than the highest current dividend order is used for determination of an overdraft or non-overdraft condition of the dividend.

The three order sensing carriage 1321 is identical with the sensing carriage disclosed in the previously mentioned Patent No. 2,567,120 to which reference is made for a disclosure of mechanism not described herein. Briefly, this sensing carriage 1321 comprises a carriage or frame 1320 (Fig. 16) which is slidably mounted on three shafts 1322, 1323, and 1324. Gears 1325, 1326, and 1327 (Figs. 10 and 16) are keyed to the three respective shafts and slide on these shafts with the carriage. Gears 1325, 1326, and 1327 are ordinally spaced with respect to each other and each meshes with a respective one of three sensing gear segments 1328, 1329, and 1330 which are freely pivoted on a worm shaft 1335.

Shafts 1322, 1323, and 1324 (Fig. 17) are yieldably driven through gears 1331, 1332, and 1333 (Figs. 16 and 17) which have respective spring drive connections 1331*a*, 1332*a*, and 1333*a* (Fig. 16), to each of the three shafts. Gears 1331, 1332, and 1333, are driven by a common gear segment 1334 (Fig. 17), freely mounted on shaft 1335 and which segment is rocked clockwise by movement of a link 1311 toward the right as is described hereinafter.

Clockwise movement of segment 1334 rotates gears 1331—1333 and yieldably drives shafts 1322—1324 together with gears 1325—1327 (Fig. 10) and segments 1328—1330 until the latter are stopped by their respective aligned followers 483 and associated dividend register snail cams 482, so that the position of these segments and correspondingly the respective positions of the shafts 1322 to 1324 will be representative of the positions occupied by the three aligned followers 483. The follower levers 483 contact their associated snail cams 482 during the dividend value sensing operation and therefore the positions to which shafts 1322 to 1324 are rotated are representative of the values standing in the aligned numeral wheels of the dividend register.

Rotation of shaft 1335 effects ordinal shifting of the dividend sensing carriage to align the same with respective lower orders of the dividend register. As seen in Fig. 17, shaft 1335 is driven through gears 1356, 1357, and 722 forming a portion of the gear train driven by the previously described step by step movement of shift ratchet 571.

Shaft 1322 (Figs. 7 and 16) and segment 185 keyed thereto, are rocked counterclockwise in accordance with the value sensed in the overdraft indicating order. Shaft 1323 and segment 186, keyed thereto, are rocked counterclockwise in accordance with the value standing in the highest order of the current dividend. Shaft 1324 and its keyed segment 187 are rocked counterclockwise in accordance with the value standing in the second highest order of the current dividend.

The purpose of the dividend sensing operation is to set the dividend lever 141 (Fig. 2) along the dividend scale in accordance with the value standing in substantially the entire dividend register, and since segment 186 (Fig. 7) is rotated in accordance with the crawl carry value standing in the highest order of the current dividend and is therefore representative of the entire dividend value, it is obvious that the dividend lever could be set along the dividend scale under the sole control of segment 186. With such an arrangement, however, any backlash which is present in the dividend register would be reflected in an inaccurate setting of the dividend lever, and in some cases could cause an error in quotient estimation.

The following arrangement is therefore provided to substantially eliminate the effects of backlash in the dividend register upon the setting of the dividend lever along the dividend scale. This is accomplished by: (1) translating the crawl carry movement imparted to gear segment 186 (Fig. 7) into a movement of gear 191 which is representative solely of the digital value standing in the highest current order of the dividend; (2) rotating a gear 195 by segment 187 in accordance with the crawl carry value standing in the second highest order of the current dividend; and (3) combining the movements of gears 191 and 195 by means of a planetary gearing generally indicated at 200 in such a manner as to drive a gear 214 in accordance with the summation of the digital value of the highest current order of the dividend plus one tenth of the digital and tens carry value standing in the second highest order of the current dividend. The gear 214 controls the setting of the dividend lever 141 (Fig. 2) along the dividend scale as will presently be described.

The above mentioned rotation of gear 191 (Fig. 7) by digital amounts only, and the consequent driving of the planetary 200 by this gear eliminates the effect of any backlash which may be present in the highest sensed order of the current dividend, and the effect of backlash in the dividend register is limited to that which is introduced through the gear segment 187. The backlash which may be present in the second highest order of the current dividend cannot be greater than one tenth of the value standing in the third highest dividend order, and therefore the present arrangement provides for sensing of the entire dividend within an accuracy equal to at least the digital values standing in the two highest orders of the current dividend.

The above mentioned gear segment 186 (Fig. 7) drives through the integral double idler gears 192—193 and a rocking idler 194 and tends to rotate gear 191 in accordance with the crawl carry value standing in the highest order of the current dividend. At the same time, however, gear segment 187 drives through a similar gear train consisting of idler gears 196, 197 and 198 to rotate gear 195 in accordance with the crawl carry value standing in the second highest order of the dividend. A snail cam 199 is integral with gear 195 (Fig. 8) through keyed connections to the supporting stub shaft 215, and has a follower arm 201 (Fig. 7) freely mounted on shaft 205. Arm 201 is integral with a rocking support arm 202 for the rocking idler 194. When gear segment 186 tends to rotate gear 191 in accordance with the digital and tens carry value standing in the highest dividend order, gear segment 187 rotates gear 195 clockwise in accordance with the digital and crawl carry value standing in its related order of the register, and through the snail cam 199, the follower 201, and the support arm 202, the movement of segment 187 rocks idler 194 clockwise about shaft 205 to back out of gear 191 an amount equal to the tens carry increment entered therein through segment 186.

During a dividend sensing operation therefore, gear 191 is rotated by an amount equal to the exact digital value of the highest order of the dividend. There may be some play in the gear train between gear segment 186 and the gear 191, and which play would be reflected in the movement imparted to the planetary 200 by gear 191. The following arrangement is therefore provided for causing gear 191 to drive the planetary 200 by increments corresponding to full digital steps regardless of any play in the abovementioned gear train.

This arrangement includes a cam 206 (Fig. 7) which is integral with gear 191 and has ten arcuate steps of different radii representing the digital values "0" to "9." A follower arm 207 is freely mounted on a shaft 205 and is urged clockwise by a spring 207*a* to maintain a roller 208, carried by arm 207, in contact with the periphery of the cam 206. The roller is shown in contact with the "0" step of the cam and as the cam is rotated clockwise by the dividend sensing operation the roller drops from the "0" step to the "1" step, and then to the "2" step, etc. to position the follower arm 207 on a respective step corresponding to the digital value standing in the highest order of the current dividend. Since the steps on cam 206 are each formed as an arcuate surface the roller 208 may contact any part of a respective step and obtain the same definite movement of the follower 207 regardless of any play in the above described gear train which rotates the stepped cam 206.

The clockwise movement of the follower 207 is effective to introduce a drive into the planetary gearing 200 corresponding to the digital value standing in the highest order of the current dividend, and at the same time the previously mentioned rotation of gear 195 by segment 187 is effective to introduce a second drive into the planetary gearing 200 corresponding to the crawl carry value standing in the second highest order of the current dividend. These two drives are combined by the gearing 200 to rotate the gear 214 by an amount corresponding to the digital value of the highest order of the dividend plus one tenth of the crawl carry value standing in the second highest order of the current dividend.

With respect to the drive imparted to the planetary gearing 200 by the follower arm 207, the latter carries a gear rack 209 which meshes with a gear 210 (Figs. 7 and 8) freely mounted on shaft 215. Gear 210 meshes with an idler gear 694 which is integral with a gear 695. The latter gear meshes with a gear 696 having a hub 211*a* which also carries an internal ring gear 211 of the planetary gearing 200. The clockwise rotation of the cam 206 is effective through the follower arm 207 and the above described gear train to transmit a drive to the ring gear 211 and rotate the same clockwise by an amount corresponding to the digital value of the highest order of the current dividend.

Concurrent with the clockwise movement of the ring gear 211, the gear 195 is rotated clockwise by segment 187. Gear 195 is fixed to shaft 215, and also fixed to this shaft is a sun gear 216 which is rotated clockwise with gear 215 by an amount corresponding to the crawl carry value standing in the second highest order of the current dividend.

The ring gear 211 and the sun gear 215 comprise two input drive gears of the planetary 200. A planet gear 212 meshes with both the ring gear and the sun gear and is mounted for free rotation on a stub shaft 213. The stub shaft is carried by the wide gear 214, freely mounted on shaft 215. The previously mentioned clockwise movements of ring gear 211 and the sun gear 215 are therefore effective to revolve the planet gear clockwise and thereby rotate the wide gear 214 by an amount corresponding to a summation of the respective drives imparted to the planetary gearing by the ring gear 211 and the sun gear 215.

Gear 214 meshes with and drives a gear 217 (Fig. 2) counterclockwise. Gear 217 is freely mounted on a shaft 230 and meshes with a gear 218 of the double idler 218—219. The latter gear 219 drives a gear segment 220 at a reduced 1:3 rate to that of gear 217. Segment 220 has an ear 221, which, upon counterclockwise rotation of segment, rotates the dividend lever 141 counterclockwise along the dividend scale in correspondence with the value sensed in the dividend register, assuming for present example that the divisor is above 3.16 and that the trebling mechanism is therefore disabled. The setting of the dividend lever 141 along the dividend scale is effective, in cooperation with the setting of the divisor lever 142 along the divisor scale, to operate the quotient pre-estimating mechanism, as previously described and close one of the quotient switches 150–160 corresponding to the ratio of the dividend to the divisor.

If the divisor is some small value that is trebled, then the dividend is also trebled. An ear 254 (Fig. 2) on gear 217 is moved counterclockwise at a rate three times as great as the ear 221; therefore the value of the dividend as determined by setting of the dividend lever along the dividend scale may be trebled by moving the dividend lever counterclockwise away from ear 217 and into contact with the ear 254.

Figure 5:
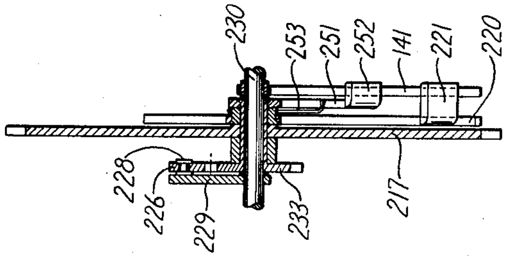
Fig. 5 is a sectional view of the dividend value representing lever and related mechanisms taken along line V—V in Fig. 2.

The following mechanism is provided for effecting the trebling movement of the dividend lever. An arm 222 (Fig. 2) is integral through sleeve 223 with the previously described treble control arm 176 and which arm 222 has a pin and slot connection 224—225 with a link 226. At its lower end, link 226 has another slot 227 which embraces two pins 228 carried by a plate 229 (Figs. 2 and 5) freely mounted on shaft 230. Plate 229 and pins 228 support the link 226 at a constant radius from shaft 230 regardless of the position to which the link 226 may be rocked. A gear rack 232 (Fig. 2) is formed on link 226 and meshes with a gear 233 the hub of which is freely mounted on shaft 230. A lever 251 is fixed to the hub of gear 233 and has an ear 252 lying adjacent the dividend lever 141. A torsion spring 253 urges lever 251 counterclockwise, but such movement normally is blocked since gear 233 and the gear rack 232 are in locked condition due to pin 224 lying in the bottom of slot 225 in link 226. When the divisor is trebled, in the manner previously described, arms 176 and 222 rock counterclockwise and the pin 224 moves upwardly in slot 225. With this condition of the parts, the torsion spring 253 is effective to cause lever 251 and the ear 252 to rotate counterclockwise and urge lever 141 counterclockwise away from ear 252 and against the ear 254 on gear 217. In this respect it will be noted that spring 253 is of sufficient strength to overcome spring 173 and cause lever 251 to force the dividend lever 141 counterclockwise against ear 254.

From the above description it will be seen that the dividend lever 141 is set along the dividend scale to a position representative of the dividend value sensed, or to a position representative of a value three times the value of the dividend, depending on whether the divisor treble control mechanism is disabled or enabled during dividend sensing. In either case the quotient bell crank 143 is moved as a resultant of the adjustments of both the dividend lever 141 and the divisor lever 142 and such movement closes a respective one of the switches 150–160 which is representative of the ratio of the dividend to the divisor.

*Sign determining mechanism*

The mechanism for determining the sign of the dividend register is controlled by the value standing in the first order to the left of the highest current dividend order and is provided for the purpose of enabling and disabling the primary or complementary pre-estimator, and for determining minus or plus operation of the actuators, depending upon whether the sign of the register is positive or negative. When there is no overdraft, the value standing in the sign determining order is "0" plus tens carry from the next lower order, and when there is an overdraft the value standing in the sign determining order is a "9" plus tens carry from the next lower order. If a "0" is sensed in the sign determining order a mechanism is effective to hold a switch 259 (Fig. 20) closed, and when a "9" is sensed, the mechanism opens the switch 259. Switch 259 is in a circuit between the main line 911 and a common lead to both the relay 916 and the main reverse magnet 533. The depression of the equals (=) key closes switch 1269, as previously mentioned and if the switch 259 is retained in closed condition by the determination of a positive sign in the dividend register then a circuit is completed to the relay 916 and the M. R. magnet 533 thus causing the energization of both. The energization of relay 916 moves the gang switches 790–800 to their lower dotted line positions and thus throws the quotient switches 150–160, associated with the primary pre-estimator, into circuit for control of the quotient estimating operation. The energization of the main reverse magnet 533 adjusts the numeral wheel actuators for subtraction of the divisor from the positive dividend, or remainder.

When a negative sign is determined in the dividend register the switch 259 is opened, thus opening the circuits to said relay 916 and the M. R. magnet 533 and de-energizing the same. With relay 916 de-energized, the switches 790–800 assume the full line position shown in Fig. 20 to throw the quotient switches 280–290 of the complementary pre-estimator into circuit, while the de-energization of the M. R. magnet 533 adjusts the numeral wheel actuators for addition of the divisor to the negative (overdrafted) dividend remainder.

The mechanism for opening and closing switch 259 includes a gear segment 185 (Fig. 7), which drives a gear 256 through the rocking idler gear 255. A cam 257 is integral with gear 256 and has a follower 258 with an insulated tip which normally holds the switch 259 closed. When the divided register is of a positive sign, then during the dividend sensing operation a "0" is sensed and no perceptible movement is imparted to the gear segment and the cam 257. In this manner the sensing of "0" is effective to maintain the switch 259 closed. If the dividend register is of a negative sign, then a "9" is sensed by the sign sensing mechanism and the segment 187 is moved to an extreme counterclockwise position, thus rotating gear 256 and the cam 257 counterclockwise and opening the switches 259.

The cam 257 is always rotated to a full digital position of either "0" or "9" to insure positive opening or closing of the switch 259. During the movement of segment 185 to rotate cam 257 in accordance with the digital and tens carry value standing in the sign determining order of the register, the previously mentioned lever arm 207 rocks clockwise in accordance with the value standing in the next lower order which is the highest order of the current dividend. Arm 207 is integral with a lever 260 through a bail 261 and has pin and slot connection with the lower arm 262 of a rocking support arm 263 for the idler 255. The idler 255 is rocked counterclockwise in proportion to the value sensed in the highest current dividend order and backs the partial tens carry increment sensed in the sign determining order out of gear 256. The cam 257 is therefore set at a full digital position and positively closes or opens the switch 259.

*Special design of dividend register snail cams 482*

Figures 7, 8:
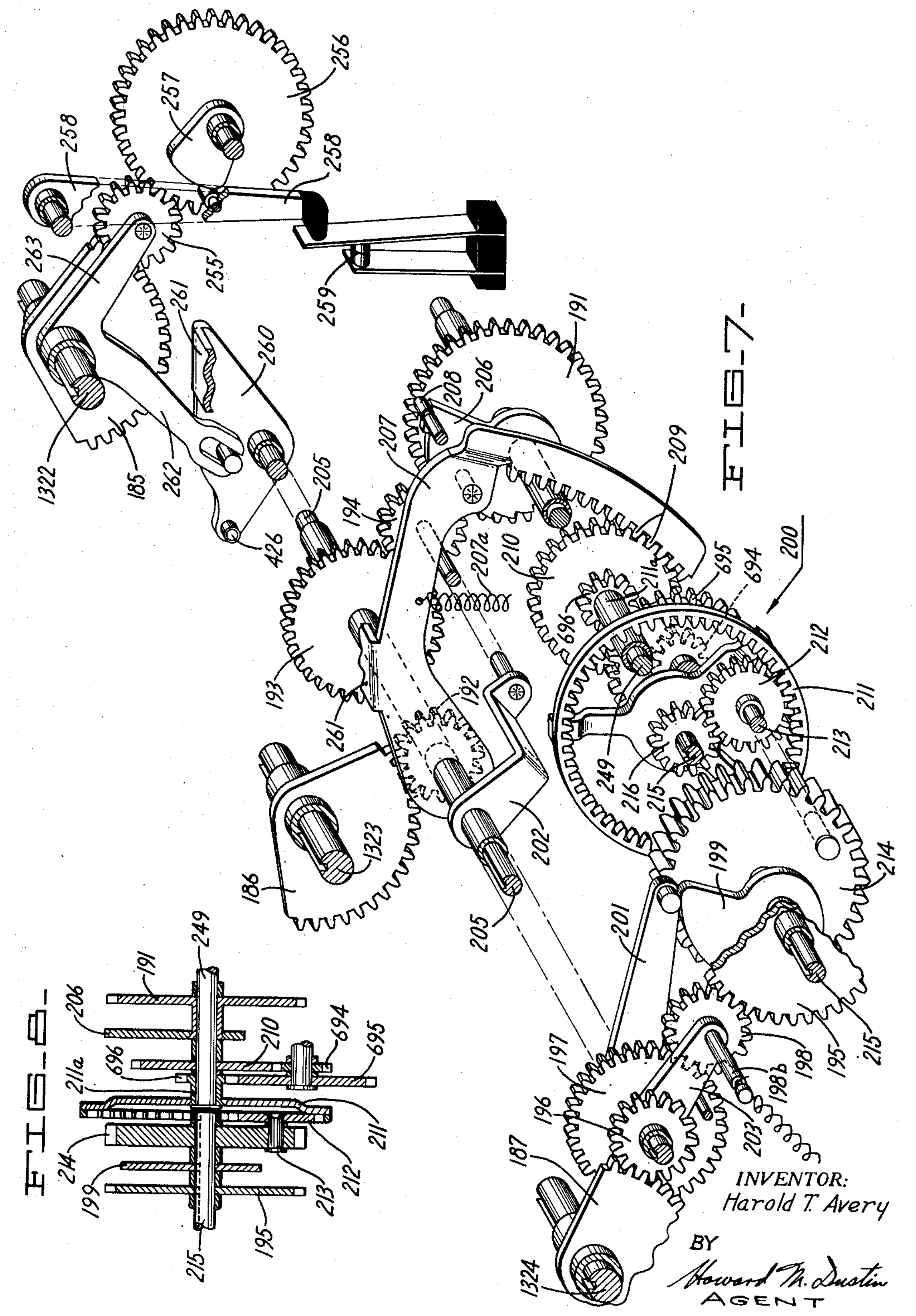
Fig. 7 is an enlarged isometric projection of the mechanism for compounding the values sensed in the three highest orders of the dividend, as seen from the right rear of the machine.
Fig. 8 is a sectional view of part of the compounding mechanism shown in Fig. 7 as seen from the rear of the machine.

In some cases there may be backlash in the inter-ordinal gearing of the dividend register and which backlash may cause the snail cams 482 (Fig. 10) to be rotated slightly ahead of, or behind, their true value indicating positions. For example, in order where a snail cam 482 should stand at a value of "3" it may, instead, stand at a value as small as 2.7 or as great as 3.3 depending on the amount and direction of backlash. This backlash normally has no appreciable effect upon the dividend sensing operation and the setting of the dividend lever 141 since such backlash is compensated for by the stepped cam 206 (Fig. 7).

There is one case, however, where backlash in the dividend register might have some effect on the dividend sensing operation. It will be recalled that the snail cams 482 (Fig. 10) are graduated from their largest to their smallest periphery to represent the values "0" to "9" respectively. If a value of "0" stands in the highest order of the current dividend and there is backlash in the inter-ordinal gearing of the dividend register, then the aforementioned snail cam may stand at a value of 9.7 for example. If the snail cams 482 were designed to drop off from the high to the low periphery of a cam when there is only a slight movement from a "0" registration such as to 9.9 for example, then the snail cam follower 483 in sensing a value of 9.7 would drop to the low point of the cam. This would cause the segment 186 (Fig. 7) to rotate to its extreme counterclockwise position and the step cam 206 would be rotated to a "9" position by the follower arm 207 even though the controlling order snail cam 482 theoretically stood at a "0" registration. The "0" periphery of cam 482 is therefore extended approximately .5 of a digital increment toward the "9" position of the cam to insure the sensing of a true "0" value even though the backlash in the inter-ordinal planetary gearing may position the snail cam 482 at a false value of 9.7, for example.

This extension of the snail cam would cause one type of false sensing if not prevented from doing so by the following mechanism, namely, a sensing of a "0" when the actual value standing in said cam is some value between 9.5 and "0." False sensing of a "0" when the true value is between 9.5 and "0," however, does not prevent the stepped cam 206 (Fig. 7) from being adjusted to its true "9" position. It will be recalled that the rocking idler 194 (Fig. 7) is rocked clockwise in accordance with the value sensed in the second highest order of the current dividend, and in any given case the amount of such rocking equals the amount of the tens carry increments transmitted to the highest order of the current dividend; therefore, the rocking of idler 194 rotates the gear 191 and the stepped cam 206 counterclockwise by an amount corresponding to the value of such tens carry increments and thus positions the cam 206 in accordance with the true digital value standing in its associated order of the dividend register which is a "9." At such time the roller 208 drops off of the highest periphery of the cam 206 directly onto the lowest periphery thereof, thus rotating the ring gear 211 through nine increments to its "9" position even though a false "0" represented by cam 482 (Fig. 10) has been sensed in the highest current dividend order. From the above discussion, it will appear that even though a false "0" is sensed by cam 482 and follower 483, the dividend components of the pre-estimating mechanism will be adjusted to a true value representation by cam 206 (Fig. 7) and its related mechanism.

*Complementary pre-estimating mechanism*

The primary pre-estimator may pre-estimate a quotient digit which causes an overdraft in the dividend register, and a shifting operation occurs simultaneously with each numeral wheel actuation, therefore the dividend remainder, at the beginning of any ordinal division operation, may be a negative value. A mechanism, referred to as the complementary or secondary pre-estimator is therefore provided to compare the "hundreds" complement of the negative value standing in the two highest orders of the current dividend with the value of the divisor and thus obtain a pre-estimated value for negative or short-cut entry of the quotient digit. This value obtained by the complementary pre-estimator controls the number of positive cycles of numeral wheel actuation in the same way that a quotient digit which is established by the primary pre-estimator controls the number of negative cycles of numeral wheel actuation.

The complementary pre-estimating mechanism includes the previously mentioned divisor lever 142 (Figs. 2 and 9) and a complementary dividend lever 265 (Fig. 9), which jointly control the setting of a quotient bell crank 266. The complementary pre-estimating mechanism is similar in all respects to the primary pre-estimating mechanism with the exception that the dividend lever 265 normally stands at a value of 100 on a complemental dividend scale and is moved clockwise to a position representative of the complement of the dividend value sensed, whereas the primary dividend lever 142 (Fig. 2) normally stands at a value of "0" on the dividend scale and is moved counterclockwise to its value representative position.

Figure 9:
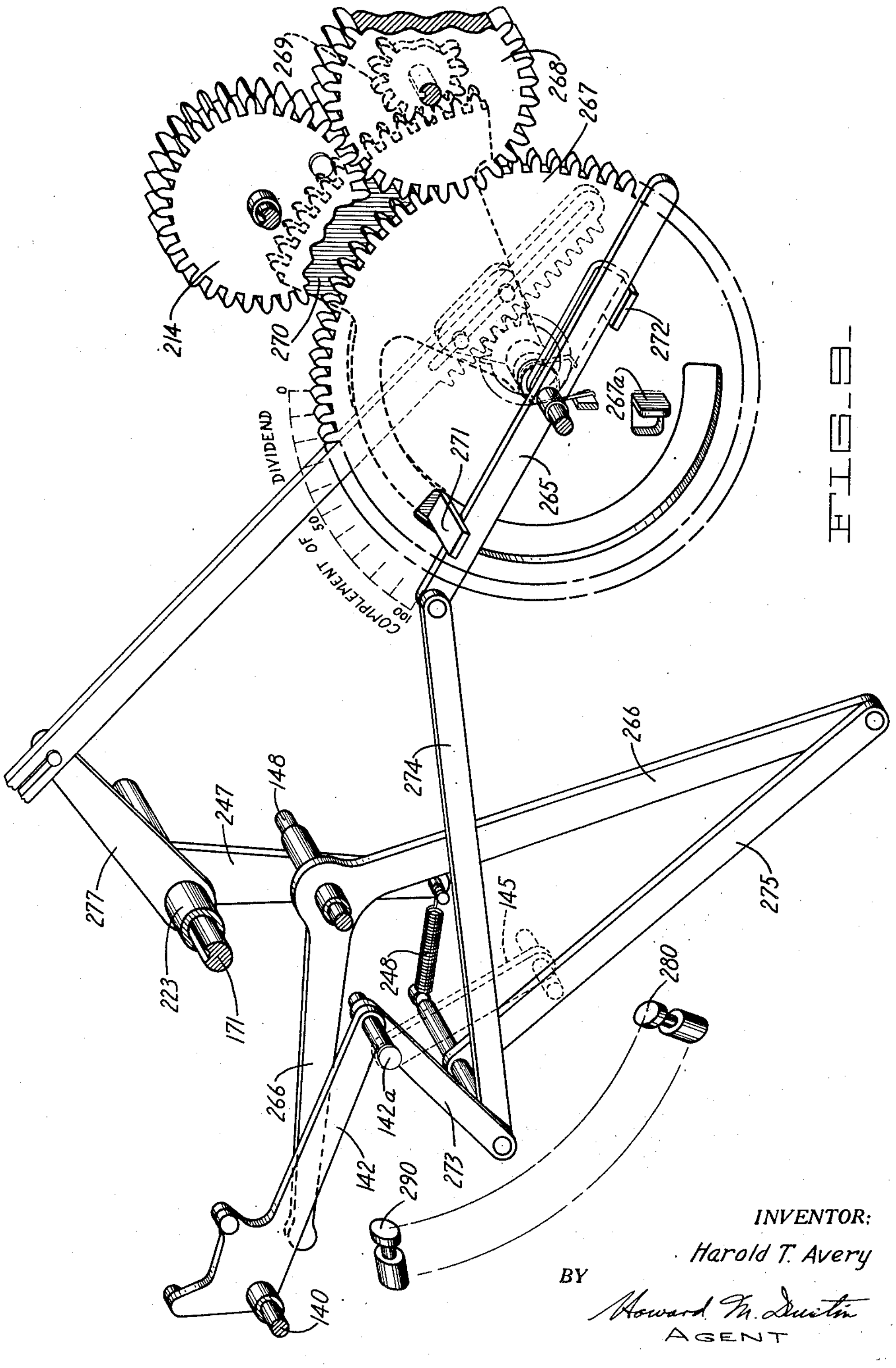
Fig. 9 is an enlarged isometric projection of the complementary pre-estimating mechanism as seen from the right rear of the machine.

The above mentioned dividend lever 265 is moved clockwise to a position representative of the complement of the value of the dividend by mechanism including the wide gear 214 (Fig. 9). Gear 214 drives through the wide idler 268 to rotate a gear 267 (Fig. 9) clockwise, and an idler 269 integral with idler 268 drives a gear segment 270 clockwise so that gear 267 is driven three times the amount that gear segment 270 is driven. It will be noted that this arrangement corresponds to that of the primary pre-estimating mechanism except that gear 267 and gear segment 270 of the complementary pre-estimating mechanism are driven clockwise by gear 214 while gear 217 (Fig. 2) and segment 220 of the primary pre-estimating mechanism are driven counterclockwise by gear 214. Segment 270 (Fig. 9) has an ear 271 extending through a slot in gear 267, which ear normally controls the setting of the dividend lever 265 by limiting the clockwise movement thereof, while gear 267 has an ear 267*a* which controls the setting of lever 265 when the divisor trebling mechanism is enabled as will presently appear.

Figure 20:
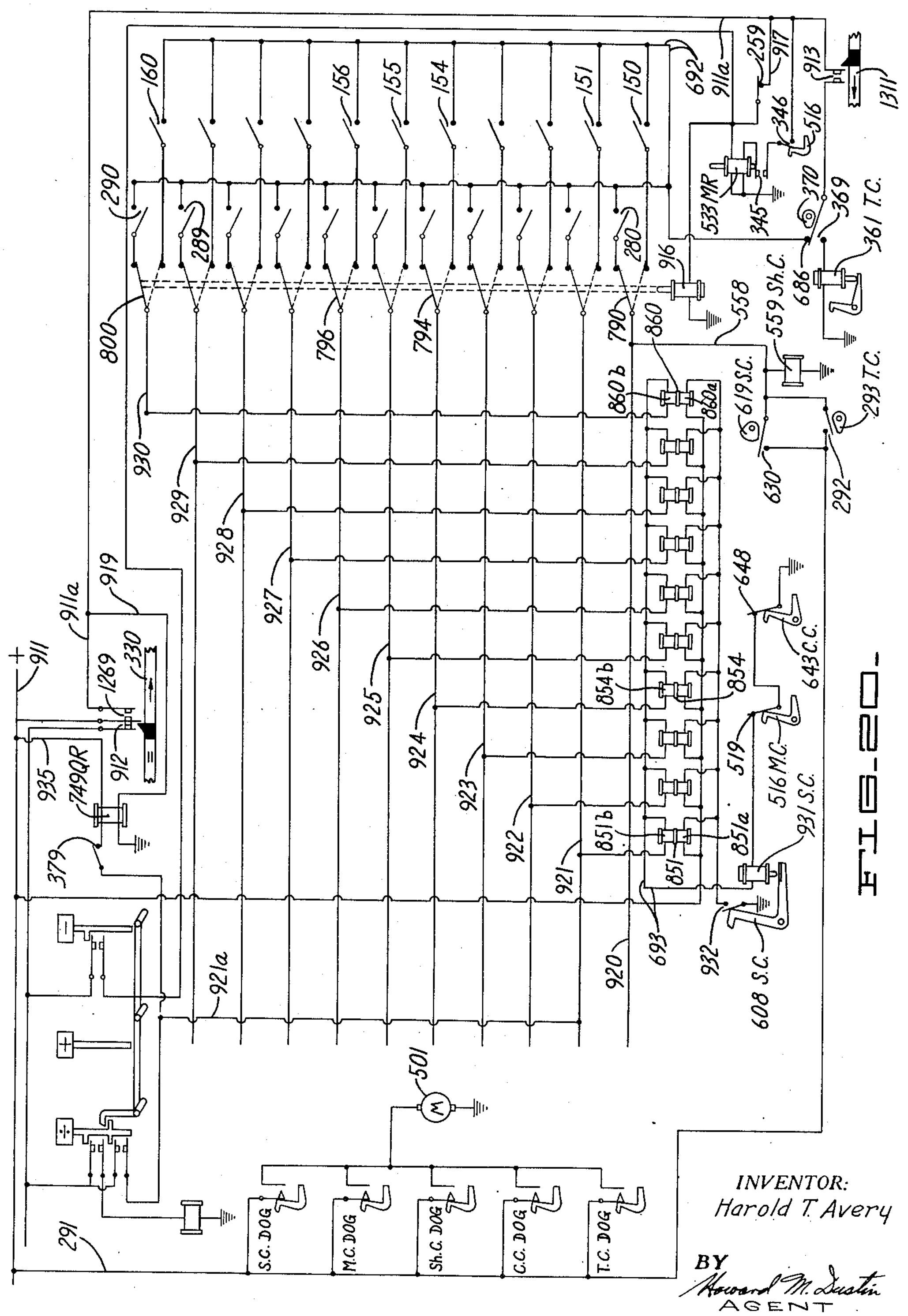
Fig. 20 is a wiring diagram showing the various electrical controls used in division operations.

The divisor lever 142 (Fig. 9) has pivotal connection with a link 273 corresponding to the link 145 of the primary pre-estimator, and which link 273 operates in conjunction with the complementary dividend lever 265 and links 274 and 275 to rotate bell crank 266 counterclockwise and close one of the series of complementary or secondary quotient switches 280–290 (Figs. 9 and 20).

A trebling control arm 277 (Fig. 9), integral with a similar arm 222 (Fig. 2) of the primary pre-estimator is provided for controlling the trebling mechanism of the complementary pre-estimating mechanism. Since the trebling mechanisms of both pre-estimators are similar in all respects, further description is believed unnecessary, it being noted that the complementary dividend lever 265 (Fig. 9) is spring urged clockwise against the ear 271 to a position representative of the value of the complement of the dividend when the trebling mechanism is not enabled, and in those cases where the trebling mechanism is enabled, the complementary dividend lever 265 is controlled by the ear 267*a* to set the lever 265 at a value of three times the value of the complement of the dividend. In either case the movements of the divisor lever 142 and the complementary dividend lever 265 constrain the complementary bell crank 266 to close one of the switches 280–290 in accordance with the ratio of the complement of the dividend remainder to the divisor.

At the beginning of division and also upon the operation of the sensing mechanism in each order of division, both the primary and the complementary pre-estimating mechanisms are enabled and the two bell cranks 143 (Fig. 2) and 266 (Fig. 9) each close a switch of their respective series of switches 150–160 and 280–290. Only one of the two series of switches 150–160 and 280–290, however, is effective to control the machine during any ordinal pre-estimation since the two series of switches 150–160 and 280–290 are selectively enabled in accordance with the sign of the dividend register.

*Control of shift clutch*

The shift clutch 550 (Fig. 17) operates through the shift drive train previously described to cause ordinal shifting movement of the carriage 301 (Fig. 10) in which the divisor is stored, the divident sensing carriage 1321, and the counter register interponent 716 (Fig. 11).

Engagement of the shift clutch 550 (Fig. 17) is controlled by the energization of the shift clutch solenoid 559 which is diagrammatically illustratd in Fig. 20. The shift control circuit includes a lead 291 (Fig. 20), connected to the main power line 911, and either of the switches 292 or 630, through the solenoid 559 to ground to cause energization of that solenoid. Switch 630 is closed by a setting clutch cam 619 described in the previously mentioned Patent No. 2,567,120 while switch 292 is closed by a terminating clutch cam 293. The control of the cams 619 and 293 is more fully described in a later section on division operations.

The shift clutch solenoid may also be energized by a "0" pre-estimation and the resulting closure of either of the "0" pre-estimation switches 150 or 280, as described hereinafter.

*Equals (=) key*

The depression of the equals (=) key 128 (Figs. 1 and 14) enables the division control mechanism and the division control circuits to cause automatic pre-estimation short-cut division operations. The mechanical and electrical devices which are directly or indirectly affected by the depression of the equals (=) key to condition the machine for division and to initiate a division operation are itemized below and described in detail thereafter. (1) The divisor lock gate 341 (Fig. 10) locks the three highest order numeral wheels 231 of the indicator 102 and thereby locks the divisor cams 167, 168, and 174 (Fig. 2) in a position corresponding to the value of the divisor entered into the machine; (2) shaft 171 and lever 172 (Fig. 2) are rocked counterclockwise to tension the spring 173 and set the divisor lever 142 along the divisor scale under the control of cams 167, 168, and 169; (3) switch 1269 (Figs. 15 and 20) is closed and switch 912 is opened to condition the electrical control circuits of the machine for division operation and to energize the quotient reverse magnet 749 (Fig. 20); (4) the dividend sensing carriage 1321 (Figs. 10 and 16) is enabled to determine the value and the sign of the dividend; (5) the dividend lever 141 (Fig. 2) is set along the dividend scale in accordance with the dividend value sensed and, in cooperation with the divisor lever 142, moves the quotient bell crank 143 to a position representative of the ratio $$\frac{Dv}{Dr}$$

to close a corresponding one of the quotient switches 150–160; (6) assuming that the sign of the dividend is positive, then the switch 259 (Fig. 20) is held closed as a result of the dividend sign determining operation, to thereby energize the main reverse magnet 533 and the relay 916; (7) the energization of the main reverse magnet adjusts the numeral wheel actuators for negative actuation and the energization of relay 916 moves the switches 790–800 to their lower dotted line positions to disable the complementary quotient switches 280–290 and to enable the primary quotient switches 150–160; and finally, the switch 913 (Figs. 15 and 20) is closed to complete the main division control circuit and cause the selective energization of one of the actuation control magnets 851–860 or the shift clutch solenoid 916 (Fig. 20) depending on which one of the switches 150–160 was closed by the quotient estimating mechanism. The manner in which the depression of the equals key effects the above outlined operations will be described in detail shortly hereinafter.

In the foregoing outline it was assumed that the dividend was a positive value and that the primary pre-estimating mechanism was therefore enabled to control the quotient estimation. In any order where the dividend or the dividend remainder is a negative value, the complementary quotient estimating mechanism is enabled to control the quotient estimation and, in this respect, it will be noted that both the dividend lever 141 (Fig. 2) of the primary pre-estimator and the dividend lever 265 (Fig. 9) of the complementary pre-estimator are simultaneously set at their value representative positions during quotient estimating operations to cause simultaneous operation of the primary and complementary pre-estimating mechanisms, respectively. Only one of these mechanisms, however, is effective and the other is ineffective to control the division operation.

Returning now to the equals key and the associated linkages by means of which it performs the above mentioned operations, the equals key is so arranged that after it has been depressed it is disconnected from the key linkage and continued or repeated depression of the key will not effect the operation of the division mechanism. For this purpose, the equals key stem 294 (Fig. 14) has a lug 295 overlying a shoulder 296 of an interponent 297 pivotally connected to an arm 298 and urged counterclockwise by a spring 297c. Arm 298 is fixed to a shaft 299. Upon depression of the equals key, the lug 295 engages the shoulder 296 of the interponent 297 and forces the latter downward, thus rocking arm 298 and the shaft 299 clockwise. Near the end of the key stroke an extension 297b on interponent 297 engages a fixed pin 304, and rocks the interponent 297 clockwise out from under lug 295, thus breaking the connection between the key stem lug 295 and interponent 297. At such time a lever 300, freely pivoted at 302 and spring urged counterclockwise, snaps out from under ear 297a and into restraining engagement with ear 297a thus holding the interponent 297 disengaged from the key stem lug 295. Since the shaft 299 and the supporting arm 298 for interponent 297 are locked in their clockwise positions throughout the division operation, as will presently be described, the interponent 297 is held in its clockwise position by lever 300 and remains disengaged from lug 295 until the shaft 299 and arm 298 are unlocked and return to their initial positions.

The depression of the equals key is effective through the above described clockwise rocking of the shaft 299 (Fig. 14) to cause the division operations and it is necessary that this shaft be held in such position until the end of the division operation. Shaft 299 carries an arm 305 which is pivotally connected to a link 306. Clockwise movement of shaft 299 moves link 306 toward the left as seen in Fig. 14, at which time a latch 307, pivotally mounted at 309, engages a step 321 of slide 306 thus holding the shaft in its clockwise position.

Under certain conditions it is necessary to prevent depression of the equals key 128 (Fig. 1) and the start of division operations. One condition is when no value is set up in the divisor indicator 102 in which case all of the indicator numeral wheels stand at "0." Another condition is when an operator has set up a "0" in the highest (leftmost) order of the divisor indicator. In either case the machine is incapable of obtaining the quotient since the quotient is beyond the capacity of quotient estimation. An interlock, not shown, but similar in principle of operation to one disclosed for the division start key in the Patent No. 2,467,419 issued April 19, 1949, may be provided for the present equals key 128 in which case depression of said key is prevented when the leftmost order numeral wheel of the divisor indicator 102 stands at a "0" registration.

The previously mentioned enabling of the divisor lock gate 841 (Fig. 10) by the depression of the equals key is made possible by an arm 844c carried by shaft 299, and which arm, through the previously described connecting link 844a (Fig. 15), rocks shaft 844b (Fig. 10) and the divisor lock gate 844 counterclockwise to engage the three highest order indicator numeral wheel gears 842. This locks the related numeral wheels 231 in their respectively set positions, and through the planetary compounding mechanism 163 and the shaft 166 (Fig. 2) locks the divisor cams 167, 168 and 174 in positions representative of the divisor value.

Figures 12, 13:
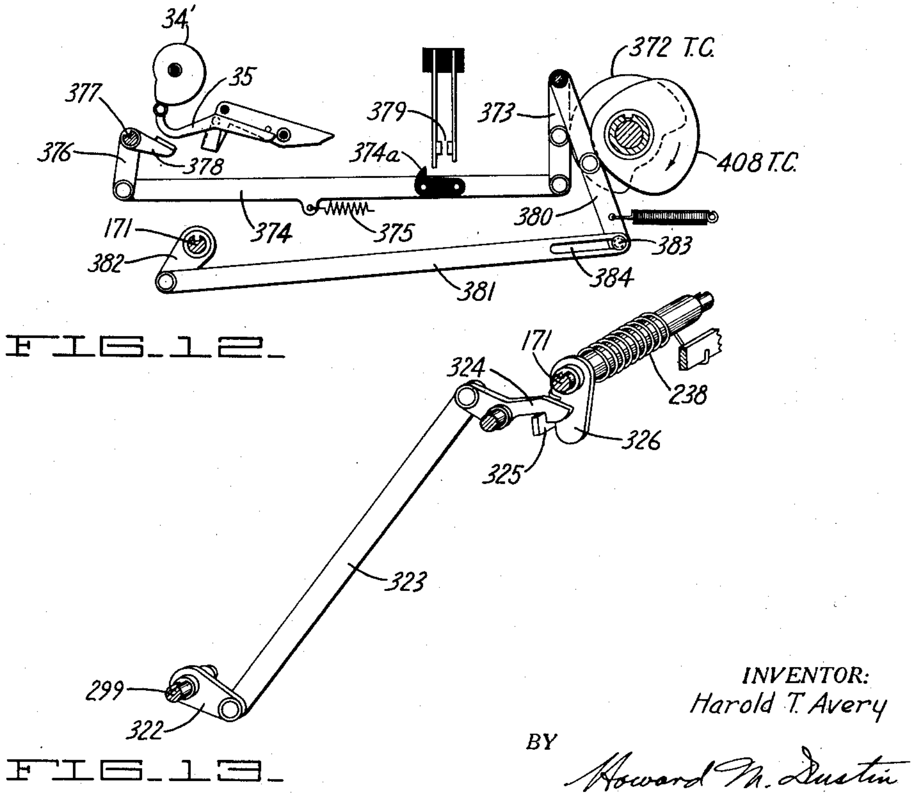
Fig. 12 is a right side view of part of the division control mechanism.
Fig. 13 is an isometric projection as viewed from the right rear of the machine, showing parts of the division initiating mechanism.

With reference to the means for enabling the divisor sensing mechanism, shaft 299 carries an arm 322 (Fig. 13) which is pivotally connected to a link 323. At its opposite end, link 323 is pivotally connected to a latch 324 which engages an ear 325 of a lever 326 fixed to shaft 171 (Fig. 2). When shaft 299 (Fig. 13) is rocked counterclockwise, the latch 324 is rocked counterclockwise to release lever 326. Lever 326 and shaft 171 then are rocked counterclockwise by a torsion spring 328 and which shaft operates through the arms 172 (Fig. 2) and 247 (Fig. 9) to tension the springs 173 and 248 respectively. The tensioning of spring 173 (Fig. 2) is effective through respective link 145 to rock the divisor lever 142 counterclockwise until roller 169 contacts cam 167, assuming that the divisor is not a value of less than three and that the trebling mechanism is disabled.

Referring now to the closing of switch 1269 (Fig. 15) and the opening of switch 912 and also the enabling of the dividend sensing mechanism, the shaft 299 (Fig. 15) carries an arm 329 pivotally connected to a slide 330. Slide 330 has an insulated ear 331 for closing the switch 1269 of the division control circuit. The closure of switch 1269 (Fig. 20) connects the main line 911 to the lead 911a and to the open switch 913. Switch 913 remains open until a dividend sensing enabling link 1311 (Fig. 15) is moved forward as explained hereinafter, to insure that the division control circuit is not closed until the pre-estimation operation is completed.

The previously mentioned closure of switch 1269 (Fig. 20) is also effective through lead 911a and lead 918 to cause energization of the quotient reverse magnet 749. Such energization is maintained throughout the division operation to cause a positive count in the quotient register of the number of cycles of negative actuation or vice versa.

With reference to the enabling of the dividend sensing mechanism, the shaft 299 (Fig. 15) is effective through the previously mentioned arm 329 and link 330 to cause a lateral extension 333 of the slide 330 to move and hold a latch 334 in an ineffective clockwise position with respect to a sensing control lever 1309 pivotally mounted at 1309b. Since the slides 306 and 330 are connected to respective arms 305 and 329 carried by shaft 299, the slide 306 is held in forward position and holds the latch 334 in a disabled clockwise position as long as slide 306 (Fig. 14) is locked in its forward position by latch 307. Slide 306 is held in forward position by latch 307 throughout the division operation and therefore latch 334 is also held in a disabled clockwise position throughout the division operation.

Upon clockwise movement of latch 334 (Fig. 15), lever 1309 rocks counterclockwise under urge of a spring 335 thus imparting leftward movement to a link 1311 which is pivotally connected thereto. The leftward movement of link 1311 rocks a bail 421 clockwise and through a connecting web 1334a (Fig. 17) rocks a sensing control gear segment 1334 clockwise to cause operation of the dividend sensing mechanism, previously described, and thus determine the value and sign of the dividend.

The determination of the value of the dividend moves the dividend lever 141 (Fig. 2) along the dividend scale in accordance with said value, and in cooperation with the divisor lever 142, causes the quotient bell crank 143 to close one of the quotient switches 150–160 in accordance with the ratio $Dv/Dr$. The determination of the sign of the dividend either opens or closes the switch 259 (Figs. 7 and 20) depending on whether the sign of the dividend is negative or positive. Assuming that the sign is positive then switch 259 is closed, and since switch 1269 (Fig. 20) has previously been closed, the main line is connected to the M. R. magnet 533 and also the relay 916 through switch 1269, lead 911*a*, lead 917, switch 259 and to the magnet and solenoid to ground. Energization of the magnet and relay adjusts the actuators for negative actuation and moves switch arms 790–800 to their lower dotted line positions.

The last part of the leftward movement of link 1311 (Fig. 15) closes switch 913 and the arrangement is such that this switch is not closed until the quotient estimation operation is completed. The closure of switch 913 completes the division control circuit including the main division switch 1269, lead 911*a*, switch 913, through a respective closed switch 150–160, through a corresponding switch of the series 790–800 to an associated buss 920–930 and therefrom either to the shift clutch solenoid 559 in case of a "0" quotient estimation or to an actuation control magnet 851–860 in case of an estimation of "1" to "10" and through the winding of the setting clutch solenoid 931 and the normally closed switches 516 and 658 to ground.

It is seen, therefore, that the final closure of switch 913 completes the above described circuit to cause energization of the shift clutch solenoid or of one of the actuation control magnets 851–860 and the setting clutch solenoid 931. Assuming that a quotient other than "0" is estimated then the setting clutch becomes engaged, and in the manner described in the previously mentioned Patent No. 2,567,120, causes engagement of the main clutch, which is under control of the actuation control magnets 851–860 to cause a number of cycles of operation of the numeral wheel actuators corresponding to the magnet energized.

After the quotient digit is estimated and before actuation of the numeral wheels and a concurrent shifting operation is begun, the dividend sensing members 1328–1330 (Fig. 10) are moved clear of the snail cam followers 483 of the dividend register to prevent interference therewith during the shifting movement of the dividend sensing carriage. For this purpose an arm 336 (Fig. 15) is fixed to the main clutch dog shaft 508 and which arm carries a pin 337 normally lying in the right end of a slot 338 in a link 339, while the left end of link 339 is pivotally connected to the dividend sensing control lever 1309. It will be recalled that upon depression of the equals key, lever 1309 is released from latch 334 and rocks counterlockwise to initiate a dividend sensing operation. At such time the lever 1309 moves link 339 toward the right with the result that the extreme left end of slot 338 lies adjacent the pin 337. When the main clutch dog is rocked clockwise to clutch engaging position the lever 336 is also rocked clockwise and pin 337 moves link 339 forwardly, thus rocking lever 1309 clockwise to its initial position. This moves link 1311 toward the right and restores the sensing control gear segment 1334 (Fig. 17) and the sensing elements 1328, 1329, and 1330 (Figs. 10 and 16) of the dividend sensing carriage to their initial "clear" positions shown. In this manner the sensing elements 1328–1330 are withdrawn from engagement with their respectively aligned snail cam followers 483 (Fig. 10) of the dividend register and are held in this position as long as the main clutch is engaged and the control lever 1309 is held in the initial position by arm 336. It will be noted that when the control lever 1309 is returned to its initial position by arm 336 as above described, the lever is not locked in this position by latch 334 since the latter is disabled throughout division operations.

In rocking to a "clear" position, the sensing elements 1328–1330 and the respective shafts 1323–1325 are moved one increment clockwise past the positions they occupy when a "0" is sensed in the divident register. The movement of shaft 1323 and segment 186 (Fig. 7) one increment clockwise from the "0" position shown in Fig. 7 to a "clear" position, is effective to rotate the gear 191 and the cam 206 counterclockwise by an amount sufficient to permit the roller 208 to drop to the low periphery of the cam if means were not provided to prevent this. The following arrangement is therefore provided to prevent such dropping movement of the roller 208.

Figure 6:
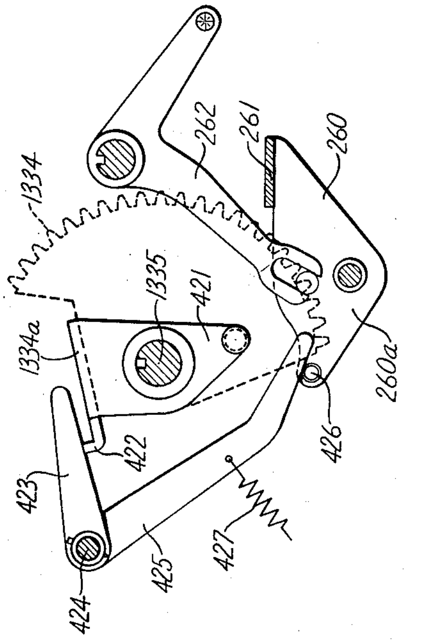
Fig. 6 is an enlarged detail view of part of the dividend sensing control mechanism as viewed from the right side of the machine.
Figure 16:
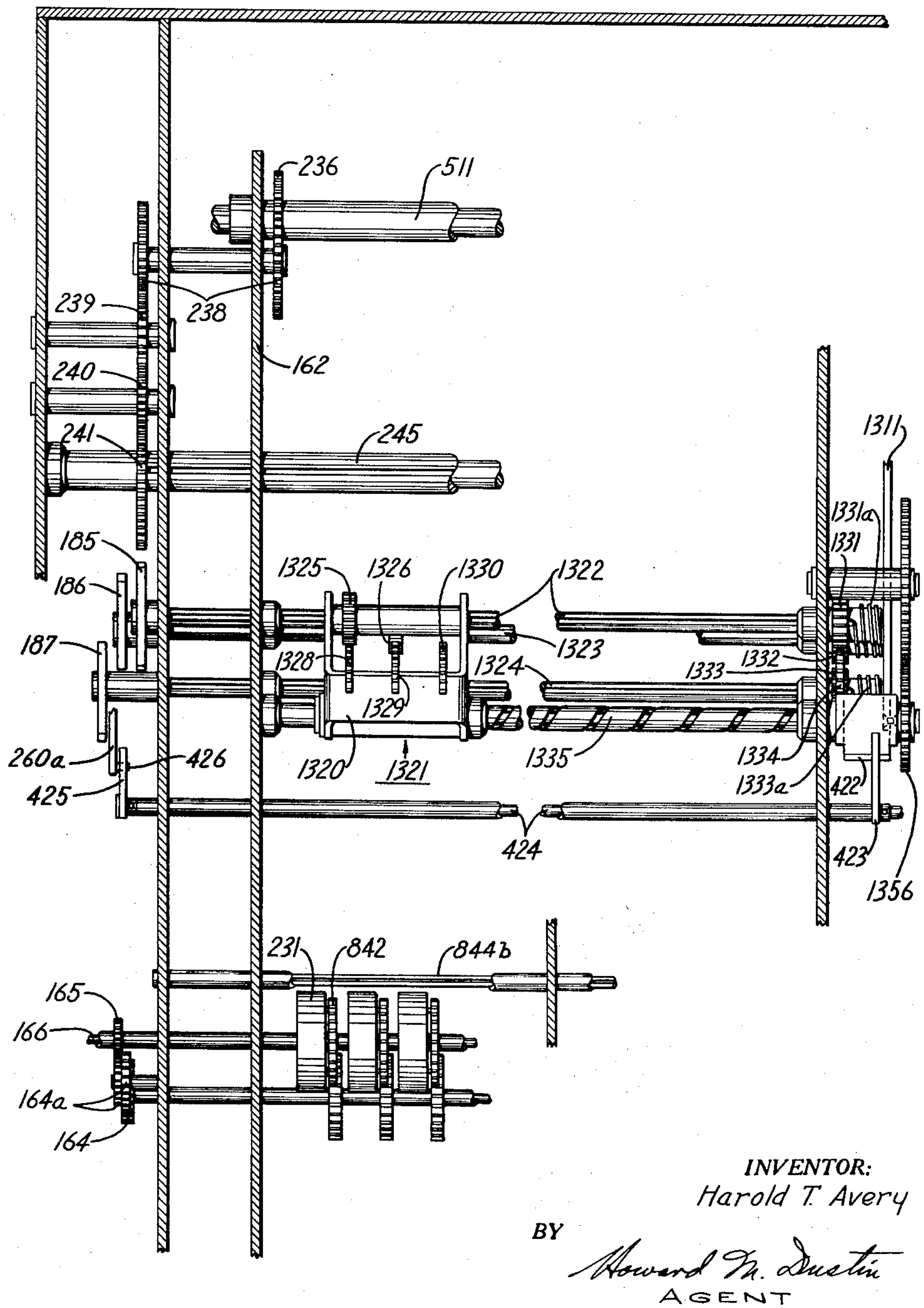
Fig. 16 is a plan view of a portion of the dividend and divisor sensing mechanism.

Gear segment 1334 (Figs. 6 and 17), as previously described, is the member by means of which the segments 185, 186 and 187 are yieldably driven to positions representative of the values standing in their respectively aligned dividend register snail cams. The web 1334*a* (Fig. 6) has an upwardly formed extension 422 (Fig. 6) underlying a lever 423 which is fixed to a transverse shaft 424 (Figs. 6 and 16). Another lever 425 is fixed to the opposite end of shaft 424 and lies adjacent a pin 426 mounted on lever 260. The arrangement is such that when segment 1334 is moved counterclockwise from "sensing" to "clear" position, levers 423 and 425 are rocked clockwise by a spring 427, and lever 260 is rocked counterclockwise, thus lifting the bail 261 attached to lever 260 and causing the follower arm 207 (Fig. 7) to hold roller 208 above the highest periphery of the stepped cam 206. The spring 427 (Fig.6) overcomes spring 207*a* (Fig. 7) in rocking the follower arm 207 counterclockwise.

It will be noted that when the gear segment 1334 (Fig. 6) is rocked clockwise during a dividend sensing operation, the extension 422 rocks levers 423 and 425 counterclockwise to prevent lever 425 from interfering with the pin 426 and extension 260*a* which are moved clockwise during the dividend sensing operation.

The movement of shaft 1324 (Fig. 7) and gear 187 from a "0" to a "clear" position also tends to rotate the previously mentioned gear 195 counterclockwise a slight amount. Any counterclockwise movement of gear 195, however, would be transmitted through the planetary 200 in a direction tending to cause the dividend lever 141 (Fig. 2) to move clockwise from the "0" position shown, but such movement is prevented by ears 252 and 254 which are snug against the lever 141. The gear 195 (Fig. 7) is therefore blocked from movement at the time the gear segment 187 is moved clockwise from a "0" to a "clear" position, and the pivot 198*b* for the rocking idler 198 therefore revolves counterclockwise a slight amount around shaft 205 in response to the clockwise movement of gear segment 187.

The rocking shaft 1322 and segment 185 of the sensing order to the "clear" position mentioned above, is effective to move cam 257 clockwise a slight amount and open the switch 259 but without any effect upon the operation of the machine at this time, because at the beginning of the next ordinal division, the segment 185 is moved from "clear" to sensing position and switch 259 is closed and then either remains closed or is again opened depending on whether the sensing element for this order senses a value of "0" or "9." In either case the final condition of switch 259 is determined by a sensing operation before the switch 913 (Figs. 15 and 20) is closed to initiate the next actuating operation.

From the foregoing it may be seen that the sensing elements 1328–1330 (Fig. 10) are moved from "sensing" to a "clear" position by the movement of the main clutch dog to clutch engaging position to thereby prevent interference between the sensing elements 1328–1330 and the snail cam follower 483 during the shift of the dividend sensing carriage which occurs simultaneously with the operation of the main clutch and the numeral wheel actuation.

When a "0" quotient is pre-estimated, however, the main clutch is not engaged and the above mentioned mechanism does not become operative to move the sensing elements 1328–1330 out of the paths of the followers 483. Means are therefore provided which are operative under the control of the shift clutch to cause the movement of the sensing elements to "clear" position before the shift clutch causes a shift of the dividend sensing carriage. For this purpose a shift clutch cam 565 (Fig. 15) is provided with a bell crank follower, freely pivoted at 1309b. The bell crank 1315 has an ear 1315b lying in the plane of the division control lever 1309, and upon clockwise rocking of the follower by the cam, the ear 1315b engages and restores lever 1309 and the sensing elements to their initial "clear" positions. Cam 565 is so designed that near the end of the shift operation the bell crank follower 1315 is permitted to rock counterclockwise to release lever 1309 from restraint of ear 1315b. Lever 1309 then rocks counterclockwise to initiate division operations in this next order in the same manner as described in connection with the depression of the equals (=) key 128.

The step by step operation of the ratchet 571 (Fig. 18) which is advanced by a shift clutch driven cam 567, as previously mentioned, causes shifting of the dividend sensing carriage from order to order. It should be noted, however, that cam 567 is so designed as to allow time for the sensing segments 1328–1330 of the sensing carriage 1321 to be restored to "clear" positions by cam 565 (Fig. 15) before the cam 567 causes a shift of the dividend sensing carriage.

From the foregoing it may be seen that the restoration of the sensing elements 1328–1330 (Fig. 10) to "clear" position and the release of the same to "sensing" position is under the control of the main clutch dog in those orders where a quotient digit from "1" to "10" is pre-estimated, whereas such restoration and release is under the control of the shift clutch in those orders where a zero is pre-estimated. In either case, each sensing operation is initiated in the new order as soon as the previous ordinal operation is completed, regardless of whether the previous operation is an actuating or a shifting operation.

*Control of main reverse magnet*

The switch 259 (Figs. 7 and 20) is closed to energize the main reverse magnet 533 (Fig. 20) when the dividend sensing mechanism determines a non-overdraft condition of the dividend register, but the circuit of this magnet is opened again at switch 259 (Figs. 7 and 20) when the dividend sensing segment 187 is moved to a "clear" position by the engagement of the main clutch, as previously mentioned. Since the main reverse magnet 533 (Fig. 20) must be energized throughout the operation of the main clutch, a stick circuit is provided to maintain the energization of the main reverse magnet 533 (Fig. 20) once it is energized regardless of the opening of switch 259 by the engagement of the main clutch.

The stick circuit includes a second winding of the main reverse magnet 533 and which second winding is energized by the closure of switches 345 and 346 whereupon a circuit is completed from the main line 911 through the main division control switch 1269, lead 912, switches 346 and 345, through the main reverse magnet to ground. Switch 345 is controlled by the main reverse magnet, and upon energization of this magnet through the first winding, as previously explained, switch 345 is closed. Switch 346 is controlled by the main clutch dog 516 and upon the first increment of movement of the main clutch dog to clutch engaging position, the switch 346 is closed thus completing the circuit to the second winding of the main reverse clutch.

It will be recalled that the movement of the main clutch dog to clutch engaging position also operates through link 339 (Fig. 15) and the division lever 1309 to move the sensing mechanism to a "clear" position, at which time switch 913 (Figs. 15 and 20) is opened. Since switch 346 (Fig. 20) is closed by the main clutch dog 516 before the switch 913 is opened, the stick circuit for the main reverse magnet is completed when switch 913 is opened, thus holding the main reverse magnet energized until the main clutch dog rocks to clutch disengaging position and opens switch 346 to the stick circuit.

*Terminating clutch*

A terminating clutch and related mechanisms become effective after the last ordinal division operation to restore the various division control mechanisms to their normal condition of rest. Also, since the machine may pre-estimate a quotient digit in the last order of division which causes a negative remainder value to stand in the dividend register, a mechanism is provided under the control of the terminating clutch to sense for an overdraft condition of the dividend register and to initiate a single plus stroke when such an overdraft condition exists.

The terminating clutch 235 (Fig. 14) is a full cycle clutch of the pawl and ratchet type and has a clutch control dog 244 pivotally mounted at 309 which normally holds the clutch disengaged. The energization of a terminating clutch solenoid 361 is effective to rock the clutch control dog 244 clockwise to clutch engaging position.

The terminating clutch solenoid 361 (Fig. 20) is energized when switches 1269, 913 and 369 are closed thus completing a circuit from the main line 911 through these switches and solenoid 361 to ground. Switch 1269 is closed throughout division operations, as previously explained. Switch 913 is controlled by lever 1309 (Fig. 15) which moves counterclockwise at the end of each ordinal division operation and thus causes switch 913 to be closed. Switch 369 is closed by cam 370 (Fig. 19) during the shift clutch operation which occurs during the last ordinal division operation. At the end of the last ordinal division operation then, the switches 1269 and 369 are closed and when the dividend sensing lever 1309 (Fig. 15) completes its counterclockwise movement, the switch 913 is closed to complete the circuit to solenoid 361. This energizes the solenoid and causes engagement of the terminating clutch, which operates for one cycle and then becomes disengaged.

The clockwise rocking of the terminating clutch dog 244 (Fig. 14) to clutch engaging position causes the leftwardly extending tail 371 of the clutch dog to engage an ear 403 on latch 307 and lift the latch out of restraining engagement with slide 306, which slide then moves to its initial rightmost position. This movement of slide 306 is effective through arm 305, shaft 299 and arm 329 (Fig. 15) to return slide 330 to its initial rightmost position at which time switch 1269 of the division control circuit is opened. The opening of switch 1269 opens the circuit of the terminating clutch solenoid and the terminating clutch (which is engaged at this time) continues to operate until the end of its first cycle whereupon it becomes disengaged.

The above mentioned rightward movement of slide 330 also moves ear 333 thereof out of restraining engagement with latch 334. The latter thus returns to a position in which it is effective to engage ear 1309c and hold lever 1309 when that lever is restored to its initial position by mechanism previously described.

A series of four control cams are driven by the single cycle terminating clutch. These cams operate mechanisms to cause restoration of the division mechanisms to normal, and also to control the operation of a selective plus stroke mechanism. The termination clutch cam 293, diagrammatically illustrated in Fig. 20 closes switch 292 in the circuit of the shift clutch solenoid 553 and initiates a shift clutch operation. Shift clutch cam 565 (Fig. 15) thereupon restores the sensing control lever 1309 to its initial clockwise position where it is locked by the latch 334 mentioned above.

A terminating clutch cam 372 (Fig. 12) rotates clockwise and through a follower 373 permits a spring 375 and link 374 to rock an arm 376 and a keyed shaft 377 counterclockwise. This urges a lever 378, fixed to shaft 377, into contact with a snail cam follower 35 of the dividend numeral wheel aligning mechanism. The follower 35 which is contacted lies one order to the left of the highest possible divisor order when the machine is in the last order of divisor operations and in the machine of the present invention the follower 35 which is contacted is in the ninth order from the right, there being eight divisor orders. If an overdraft occurs during the last ordinal division operation, then upon numeral wheel alignment, a "9" stands in this ninth order and the follower 35 contacts the low periphery of the snail cam 34' as described in the previously mentioned Patent No. 2,622,805. Lever 378 is therefore permitted to rock counterclockwise and move link 374 toward the right, at which time an insulated ear 374a on link 374 closes a switch 379. If an overdraft has not occurred then follower 35 stands on the high periphery of snail cam 34' and switch 379 remains open.

Switch 379 (Fig. 20) is in an alternative control circuit including lead 935 connected to the main power supply line 911, a second winding of the quotient reverse magnet 749, to switch 379, and from switch 379 to a lead 921a and the bus 921. When bus 921 is energized a single corrective plus stroke is initiated in the same manner as if a "1" were pre-estimated, as previously described, and also the quotient reverse magnet 749 is energized to cause negative entry of a "1" into the counter register. The alternative circuit for the quotient reverse magnet 749 is necessary since the circuit including first winding of this solenoid is open at switch 1269 at the time a selective corrective plus stroke is initiated.

A terminating clutch cam 408 (Fig. 12) is effective through a follower 380, link 381 and arm 382 to restore the shaft 171 to the initial clockwise position shown. It will be recalled that depression of the equals key causes shaft 171 (Fig. 13) to be released from restraint of latch 324 (Fig. 9) and to rock counterclockwise. In the counterclockwise position of shaft 171, the arm 382 (Fig. 12), keyed thereto, stands in a counterclockwise position and moves a link 381 to the right so that a pin 383 carried by follower 380 stands in the left end of a slot 384 in link 381. The rotation of cam 408 restores the link 381, arm 382 and shaft 171 to the initial positions shown at which time latch 324 (Fig. 13) locks arms 326 and shaft 171 in their initial positions.

The clockwise movement of the terminating clutch dog 344 (Fig. 14) to clutch engaging position, as previously mentioned, causes the tail 371 of said dog to lift the latch 307 out of restraining engagement with the slide 306, whereupon the latter returns to its initial forward position. Such movement of the slide restores shaft 299 and arm 298 to their initial clockwise positions and permits the interponent 297 to rise to its initial position where it underlies the lug 295 of the equals key stem. At such time the connection between the equals (=) key 128 and shaft 299 is re-established.

If an operator should depress the equals key after the connection between the key and shaft 299 is re-established, and hold the key depressed far enough to close the switches 1269 and 913 (Fig. 15), but not depressed far enough to break the connection between the key and the shaft, then the terminating clutch would be re-engaged time after time if the following mechanism were not provided to prevent it.

Mechanism is therefore provided to break the connection between the partially depressed equals key and the shaft 299 during the terminating clutch cycle. A cam 385 is driven by the terminating clutch and has a follower 386 which carries an ear 387 lying in the plane of a step 388 formed on link 306. Upon rotation of cam 385, follower 386 rocks clockwise and ear 387 forces link 306 leftwardly, rocking the shaft 299 and arm 298 clockwise. In this manner the interponent 297 is rocked down to break the connection between the key 128 and shaft 299 and continued depression of key 128 therefore has no effect on the terminating of division operations. It will be noted that the radial surface of cam 385 is such that interponent 297 is held clockwise until near the end of the terminating clutch cycle, and repeated depressions of key 128 up to the end of machine operations have no effect on the termination of operations.

SUMMARY OF DIVISION OPERATIONS

The division operation may best be described by first outlining the various steps involved in working out a typical division problem. Let us assume that a dividend value of 668,542 has been entered into the dividend register 100 (Fig. 1) and that a divisor value of 742 has been entered into the factor indicator 102. Depression of the division start or "equals" (=) key 128 then is effective to initiate automatic pre-estimation short-cut division operations which cause entry of a quotient value of 901 into the register 101 as follows:

In the first ordinal division operation the relationship of the dividend to the divisor is as follows:

0668542=Dividend (Dv)
742=Divisor (Dr)

The values sensed in both the dividend register 100 (Fig. 1) and the divisor indicator 102 are compounded by their respective crawl carry mechanisms and the value of 668+ in the dividend is compared with 742 in the divisor. The dividend is a positive value and the primary pre-estimator controls the pre-estimation. The ratio $$\frac{Dv}{Dr}=\frac{668}{742}=0.9+$$

Since 0.9 is within ±0.5 of "1," a quotient estimation of +1 occurs and "1" subtractive cycle of actuation follows:

```
 0668542=Dv
−   742 =Dr
 -------
 9926542=remainder (negative)
```

During the above subtraction both the selection storing carriage in which the divisor is stored, and also the dividend sensing carriage are shifted one order, and the ordinal relationship of the dividend remainder and the divisor in the second order is then as follows:

$Dv$=9926542
$Dr$= 742

In this case the dividend is a negative value and the complementary pre-estimator controls the pre-estimation in this order. The complement of 9926542 in the dividend register is 0073458 and the latter value is compared with the divisor as follows:

$$\frac{\text{Comp. of } Dv}{Dr}=\frac{734}{742}=.9+$$

and a quotient estimation of −1 occurs and "1" plus cycle of actuation follows since .9+ is within ±0.5 of "1." The single plus cycle of actuation gives the following result:

```
 9926542=Dv
+   742 =Dr
 -------
 0000742=remainder
```

After the shift operation which is concurrent with the plus cycle of actuation the remainder and divisor have the following relationship:

$$\frac{Dv}{Dr}=\frac{00742}{742}=\frac{1}{10}$$

and is within ±.5 of zero. A "0" pre-estimation therefore follows and causes a shift operation after which the relationship of $Dv/Dr$ is:

$$\frac{742}{742}$$

Since the remainder is a positive value the primary pre-estimator is enabled, and it will be evident that the quotient estimator estimates a "+1" and that there is "1" subtractive cycle of actuation which reduces the remainder to zero.

Thereafter, zeros are pre-estimated throughout the remaining quotient register orders and after the last order pre-estimation, the terminating mechanism is effective to stop division operations.

Since subtractive cycles of actuation are positively counted in the quotient register, the foregoing division operation obtains the following result. The first two quotient digits which are pre-estimated, namely, +1 and −1, determine a quotient of 9 in the second order by the short-cut method since the entry of +1 and −1 in successive orders is the equivalent of +10 and −1. In the third order a zero is pre-estimated which merely causes a shift and in the fourth order a +1 is entered. The quotient obtained therefore, is 901 which is the correct quotient for the problem $$\frac{668{,}542}{742}$$

A timing chart (Figs. 21 and 21A) shows the sequence of machine operations which occur in determining a quotient 901. The left hand column of the chart (Fig. 21) indicates the mechanism which perform the various operations, and the remainder of the chart, reading from left to right indicates the timing of such operations. (Fig. 21A is a continuation of Fig. 21.)

The depression of the equals key (Fig. 21, line 1) rocks shaft 299 (Fig. 13) clockwise and causes the latch 324 to release shaft 171 (line 2) which rocks counterclockwise, and through arm 172 (Fig. 2) and the spring 173 sets the divisor lever 142 at 7.4 on the divisor scale in accordance with the divisor value "842."

Depression of the equals key 128 also moves the division initiating slide 330 (Fig. 21, line 3) to active position. This movement of slide 330 closes switch 1269 (Fig. 20) of the division control circuit, and rocks latch 334 (Fig. 15) clockwise to a disabled clockwise position. The clockwise movement of latch 334 releases the division control lever 1309 (Fig. 15 and Fig. 21, line 5) which rocks counterclockwise to dividend sensing position and moves link 1311 to the left as viewed in Fig. 15. Link 1311 rocks the sector 1334 (Fig. 17 and Fig. 21, line 6) clockwise and yieldably drives the dividend sensing elements 1328, 1329, and 1330 (Fig. 10) clockwise thus causing a dividend value sensing operation and a determination of the sign of the dividend. The dividend sensing operation moves the primary dividend lever 141 (Fig. 2) and the complementary dividend lever 265 (Fig. 9) to their respective value representative positions, thus causing both the primary pre-estimator and the complementary pre-estimator to close respective ones of the two series of switches 150–160 and 280–290. Meanwhile the sign determining mechanism comprising segment 185 and cam 257 (Fig. 7) determines a positive sign in the dividend register in the case of the present example, and the plus-minus switch 259 (Fig. 20 and Fig. 21, line 8) is held closed. This causes energization of the relay 916 (Fig. 21, line 10) and also of the main reverse solenoid 533 (line 11). Energization of relay 916 (Fig. 20) moves the gang switches 790–800 to their lower dotted line positions to throw switches 150–160 of the primary pre-estimator into circuit and cuts out switches 280–

290 of the complementary pre-estimator. Energization of the main reverse solenoid 533 adjusts the numeral wheel actuators for subtractive driving of the dividend numeral wheels. In the present case, a "1" is pre-estimated in the first order of division and the #1 switch 151 (Fig. 21, line 9) is closed by the primary pre-estimator.

At this time link 1311 (Fig. 15) completes its forward movement and closes switch 913 (Fig. 21 line 12, and Fig. 20). Current then flows through switch 913 (Fig. 20) to the #1 switch 151, through switch 791 in the lower dotted line position to the #1 buss 921, the actuating winding 851*a* of the #1 actuation control magnet, through the winding of the setting clutch solenoid 931, and through switches 519 and 648, to ground.

The energization of the setting clutch magnet 931 (Fig. 21, line 13) causes engagement of the setting clutch 600 (line 14) which, in turn, rotates its line of control cams and causes engagement of the main clutch 515 (line 15). Movement of the main clutch dog 516 (Fig. 20) to clutch engaging position opens switch 519 in the circuit of the setting clutch, thus limiting the setting clutch to a single cycle of operation.

The main clutch 515 (Fig. 21, line 15) drives the actuators for one cycle as determined by the energization of the #1 actuation control magnet 851, and during the first part of the cycle of actuation the setting clutch (Fig. 21, line 14) finishes its single cycle of operation. During the latter part of this setting clutch cycle the setting clutch cam 619 (Fig. 20) closes the shift switch 630 (Fig. 21, line 16) to connect the shift clutch solenoid to the main line 901 (Fig. 20) and thus energize the solenoid. As a result of this energization, the shift clutch 550 (Fig. 21, line 17) is engaged and causes a single order shift of the selection storing carriage 301 (Fig. 10), the division sensing carriage 1321, and the counterinterponent 716 (Fig. 11).

It will be recalled that link 1311 (Fig. 15) and the sensing sector 1334 (Fig. 17) are moved to a "clear" position by the engagement of the main clutch as is indicated in Fig. 21, line 6 at 409. Switch 913 (Fig. 15, line 12) in the main division control circuit is opened by the movement of link 1311 to "clear" position and therefore prevents initiation of the next ordinal division operation until the quotient estimators are brought into play.

When the main clutch becomes disengaged as indicated at 411 (Fig. 21, line 15) the sensing control lever 1309 (line 5) is released in the second order of division operations to rock the sensing sector 1334 (line 6) to dividend sensing position and also to close switch 913 (line 12), thus initiating the division operation in the second order in the same manner as described in connection with the release of the sensing control lever by the depression of the equals key 128.

In the second order the sign of the dividend register is negative in the present example. The plus-minus switch 259 (Fig. 21, line 8) is momentarily closed by the movement of the segment 185 from "clear" to "0" position as indicated at 412, line 8, and then is opened again by the sign determining means which senses a "9" before numeral wheel actuation begins. The main reverse solenoid 533 (line 11) is therefore de-energized as indicated at 413 to condition the machine for plus operation of the dividend register numeral wheels. The previously mentioned opening of the plus-minus switch 259 (Fig. 20) also causes de-energization of relay 916 at which time the gang switches 790–800 are moved to the upper position shown to connect the switches 280–290 of the complementary pre-estimator into the actuation control circuit. In the present example, a "1" is pre-estimated by the complementary pre-estimater and the #1 complementary switch 281 is closed.

The sequence of the operations in the second order is the same as previously described for the first order with the exception that the actuators are driven in a positive direction instead of a negative direction. At the end of the second ordinal division operation, during which another ordinal shift occurs, the main clutch (Fig. 21, line 15) becomes disengaged, whereupon the sensing control lever 1309 (Fig. 21A, line 5) is again released. Lever 1309 then rocks counterclockwise to cause a pre-estimating operation which in the present example determines a "0" quotient and closes the "0" switch 150 (Fig. 20 and Fig. 21A, line 9). Then when the control switch 913 (Fig. 21A, line 12) is closed by the completion of the forward movement of link 1311 (Fig. 14), the shift solenoid 559 (Fig. 20) is energized through the circuit including switch 913, the "0" switch 150, switch 790, lead 558 and therefrom to the shift clutch solenoid 559 to ground. One cycle of operation of the shift clutch follows such energization as indicated at 414 in Fig. 21A, line 17.

The shift clutch cam 565 (Fig. 15) operates early in the shift cycle to rock the sensing control lever 1309 clockwise to a "blank" position. The resultant movement of link 1311 thereupon opens the control switch 913 (Fig. 20) to prevent re-engagement of the shift clutch at the end of its first cycle of operation.

During the operation of the shift clutch the various elements which are driven by this clutch are shifted to the next lower order, and at the end of the shift clutch operation the cam 565 (Fig. 15) releases the division sensing lever 1309 whereupon the next ordinal division operation is initiated.

In the fourth order of division operations the actuators are driven negatively for one cycle and which cycle corresponds in all respects to the first described negative cycle of actuation.

In order to shorten the length of the timing charts, it has been assumed that this fourth cycle is also the last cycle which is followed by the operation of the terminating clutch.

The shift clutch cycle indicated at 415 (Fig. 21A, line 17) occurs during the last ordinal division operation and is effective through the "last order" cam 270 (Figs. 19 and 20) to close switch 369 in the circuit of the terminating clutch solenoid 361 and to open switch 686 in the pre-estimation control circuit. Then at the end of the main clutch operation in this last order, the lever 1309 and link 1311 are again released and move toward the left as seen in Fig. 15. At such time the division control switch 913 is closed as indicated at 416 in Fig. 21A, line 12, thus completing the circuit to the terminating clutch solenoid 361 and energizing the same as indicated at 417 (Fig. 21A, line 20). The terminating clutch cam 372 (Fig. 12) causes sensing of the value standing in the ninth order numeral wheel snail cam 34' and since the remainder of the dividend has been reduced to zero by the division operation, switch 379 (Figs. 12 and 20) remains open and a corrective plus stroke is not initiated. In this case the terminating clutch merely operates to restore the division mechanisms to their initial positions.

Engagement of the terminating clutch removes latch 307 (Fig. 14) from restraining engagement with slide 306 whereupon the slide 306 (Fig. 15) and the slide 330 (Fig. 21A, line 3) return to initial forward positions. Also, the terminating clutch cam 293 (Fig. 20) closes switch 292 and then opens the same to cause a single energization of the shift clutch solenoid 559. The shift clutch (Fig. 21A, line 17) then becomes engaged for a single cycle of operation and the shift clutch cam 565 (Fig. 15) restores the division control lever 1309 to its initial position in which it is locked by latch 334. The restoration of control lever 1309 to initial position, in turn causes restoration of the sensing sector 1334 (Fig. 21A, line 6) and the pre-estimators (line 7) to their initial positions. The quotient reverse magnet 749 (Figs. 20 and 21A, line 19) is de-energized early in the terminating clutch cycle (Fig. 21A, line 19) by the above mentioned restoration of link 330 (Fig. 15) and the opening of switch 1269 (Fig. 20).

If the remainder in the last order of division had been a negative (overdrafted) value then switch 379 (Fig. 20) would have been closed to energize the quotient reverse magnet 749 and a corrective plus stroke would have been initiated as previously described to correct the overdraft during the terminating clutch cycle.

It will be evident to those skilled in the art that various component parts of the machine, or combinations of those component parts, may be substituted for those disclosed herein without departing from the principle of the invention. For example, any one of several types of crawl carry registers may be substituted for the dividend register 100 shown in the present disclosure, the only difference being that the present register 100 provides for sensing of dividend values without waiting for numeral wheel alignment whereas another register may require that the sensing of the dividend value be delayed until after numeral wheel alignment. In the latter case the main division circuit could be held open in each order and the pre-estimation operation could be delayed by a delay mechanism, such as that described in the aforementioned Patent No. 2,567,120, until the dividend register numeral wheels are aligned.

A more extensive substitution of component parts would be to substitute the combination of a different actuating mechanism, with a different dividend register for those disclosed in the present invention. Any intermittently operating actuator in combination with any desired form of register may be used in which case the only requirement is that a dividend sensing operation for quotient pre-estimation shall not occur until the digital actuation, the tens carry and the shifting operations are completed. In any case the total number of cycles of actuation will be reduced to a minimum by the use of the pre-estimation short-cut mechanisms disclosed herein.

I claim:

1. In a calculating machine having a dividend register, differential actuators therefor, ordinally shiftable divisor storing means operable in any shifted position thereof to control selected groups of ordinal actuators, a quotient register and actuating means therefor and division mechanism including the combination of, a primary quotient estimator operable to compare the dividend or dividend remainder in said register with the divisor in said storing means and to estimate a digital value which is the nearest full integer to the true quotient, means responsive to operation of the primary estimator to control the actuators to subtract the divisor from the dividend a number of times corresponding to the estimated digit, thereby leaving a positive or negative remainder in said register, mechanism for shifting said storing means from one ordinal position to the next and for operating said quotient register actuating means concurrently with the operation of the actuators, and mechanism for sensing the positive or negative sign of said remainder, with a secondary quotient estimator to compare the complement of the dividend remainder with the divisor and to estimate the quotient digit of said dividend complement and the divisor, and means controlled by said sign sensing mechanism and operable in response to the sensing of a negative remainder to render the secondary estimator effective to control positive operation of said actuators in accordance with the quotient digit estimated thereby.

2. In a calculating machine having a divisor receiving device and mechanism for entering a divisor value into said device, a dividend register and mechanism for entering a dividend into said register, register actuators operable to cause positive or negative entry of a numeral value corresponding to an integral multiple of the divisor into said dividend register, thereby leaving a positive or negative dividend remainder in said register; the combination of means controlled by said register for determining the sign character of said remainder, and reversing means adjustable by said sign determining means to control the sign of the next actuator operation, with estimating mechanism controlled jointly by said receiving device and said register and operable prior to said next actuator operation to compare the divisor with said positive or negative remainder to determine substantially the nearest number of integral times the divisor is contained in said positive or negative remainder, and means controlled jointly by said divisor receiving device and said estimating mechanism for controlling the value of said next actuator operation.

3. In a calculating machine having a crawl carry register, a value representing device including the combination of, ordinally shiftable sensing mechanism having a higher order element and a lower order element for sensing two adjacent orders of said register, compensating means operable to correct erroneous representations caused by backlash in the crawl carry gearing, said compensating means including, a higher order device, means controlled by said higher order sensing element to adjust said device to approximately a position representative of the digital and crawl carry value in the higher order sensed, means controlled by the lower order sensing element to oppositely adjust said device by an amount representative of said crawl carry value thereby adjusting said higher order device to approximately a full digital position, a graduated member positioned by said higher order device and graduated in steps each corresponding to a full digital position of said device, with value compounding mechanism, means for sensing one of the steps of said graduated member and operable under control of said member to adjust a part of said compounding mechanism to a position corresponding to the step sensed, means controlled by said lower order sensing element to adjust a second part of said compounding mechanism to a position corresponding to the value in the lower order sensed, and means comprising a third part of said compounding mechanism and adjusted under the joint control of the first and second parts thereof to a compounded position corresponding to the full digital value in the higher order sensed and one-tenth the said value in the lower order.

4. In a calculating machine having a plural order crawl carry register, a value representing means including the combination of, a device adjustable to approximately a position representative of the digital and crawl carry value in a higher order of said register, means controlled by the next lower order to oppositely adjust said device by an amount representative of said crawl carry value thereby adjusting the same to approximately a full digital position, a graduated member positioned by said device and graduated in steps each representative of a full digital position of said device; with value compounding means, a sensing element for sensing one of the steps of said graduated member and operable under control of said member to adjust a part of said compounding mechanism to a position corresponding to the step sensed, means controlled by said lower order to adjust a second part of said compounding mechanisms to a position corresponding to the value in the lower order, and means comprising a third part of said compounding mechanism and adjustable under the joint control of the first and second parts thereof to a position representative of the full digital value in said higher order and one-tenth of the value in said lower order.

5. In a calculating machine having a dividend register, a divisor receiving device, mechanism for entering numeral values into said register and said receiving device, a quotient register, control means therefor to cause registration of the plural digit quotient therein, and means operable during said registration to reduce the dividend by a corresponding multiple of the divisor to a positive or negative remainder; the combination of a quotient estimating mechanism including, a primary estimator operable under the joint control of said receiving device and said dividend register to compare said divisor with said dividend or dividend remainder to estimate the value of a corresponding quotient digit, and a secondary estimator also operable under the joint control of said device and said dividend register to compare said divisor with the complement of said remainder to thereby estimate the quotient digit of said complement and the divisor, with sign determining mechanism for sensing the sign character of said remainder and operable under control of said dividend register in accordance with the sign of the remainder to render one of said estimators effective to control said quotient register control means.

6. In a calculating machine having a dividend register, a divisor receiving device, mechanism for entering numeral values into said register and said receiving device, a quotient register, control means therefor to cause registration of a multi-digit quotient therein, and means operable during said registration of a quotient digit to reduce the dividend by a corresponding multiple of the divisor to a positive or negative remainder; the combination of a quotient estimating mechanism including, a primary estimator operable under the joint control of said receiving device and said dividend register to compare said divisor with said dividend or dividend remainder to estimate the value of a corresponding quotient digit, and a secondary estimator also operable under the joint control of said receiving device and said dividend register to compare said divisor with the complement of said remainder to estimate the quotient digit of said complement and the divisor, with means selectively settable to a first or second condition to render said primary estimator or said secondary estimator effective to control registration of the respective estimated quotient digit in said quotient register by said quotient register control means, and sign determining mechanism for sensing the sign character of the remainder in said dividend register and operable under control of said register in accordance with the sign of said remainder to selectively set said settable means to said first or said second condition thereof.

7. In a calculating machine having a dividend register, a divisor receiving device, mechanism for entering numeral values into said register and said receiving device, a quotient register, control means therefor to cause registration of a plural digit quotient therein, and means operable during said registration of a quotient digit to reduce the dividend by a corresponding multiple of the divisor to a positive or negative remainder; the combination of a quotient estimating mechanism including, a primary estimator operable under the joint control of said receiving device and said dividend register to compare said divisor with said dividend remainder to estimate the value of a corresponding quotient digit, and a secondary estimator also operable under control of said receiving device and said dividend register to compare said divisor with the complement of said remainder to estimate the quotient digit of said complement and divisor, with sign determining mechanism for sensing the sign character of said remainder and operable under control of said register when the sign of the registration therein is plus to render the primary estimator effective, and operable when said sign is minus to render the secondary estimator effective to control registration of the respective estimated quotient digit in said quotient register by said quotient register control means.

8. In a calculating machine having a dividend register, a divisor receiving device, mechanism for entering numeral values into said register and said receiving device, a quotient register, quotient register actuating means, reversing means to cause positive or negative quotient registration by said actuating means, means for determining the numeral value of said quotient registration, and means operable during positive registration in said quotient register to reduce and during negative registration to augment the dividend by a corresponding multiple of the divisor to a positive or negative remainder; the combination of a quotient estimating mechanism including, a primary estimator operable under control of said receiving device and said dividend register to compare said divisor with said remainder to estimate the value of a corresponding quotient digit, and a secondary estimator also operable under control of said receiving device and said dividend register to compare said divisor with the complement of said remainder to thereby estimate the quotient digit of said complement and the divisor, with sign determining mechanism for sensing the sign character of said remainder and operable under control of the dividend register in accordance with the sign thereof to render one of said estimators effective to control said value determining means, and a sign control means for said quotient register also operable under control of said sign determining mechanism to enable the reversing means to determine the sign of said quotient registration.

9. In a calculating machine having a dividend register, a divisor receiving device, mechanism for entering numeral values into said register and said receiving device, a quotient register, and actuating means therefor; the combination of, a series of selectively settable primary quotient elements and a series of selectively settable secondary quotient elements alternatively operable to control said quotient register actuating means to cause registration of a digit of the quotient of the dividend or dividend remainder divided by the divisor or the complement of a dividend remainder divided by the divisor, means operable during said quotient registration to reduce the dividend to a positive or negative remainder, and a quotient estimating mechanism including, a primary estimator operable under control of said receiving device and said dividend register to compare the divisor with the dividend or dividend remainder and to selectively set one of said series of primary quotient elements corresponding to the estimated quotient digit, and a secondary estimator also operable under control of said receiving device and said dividend register to compare the divisor with the complement of the remainder and to selectively set one of said series of secondary quotient elements corresponding to the quotient digit of said complement and divisor, with sign determining mechanism for sensing the sign character of the value in said dividend register and operable under control of said register in accordance with the sign of the registration therein to render one of said series of quotient elements effective to control said quotient register actuating means.

10. In a calculating machine having a dividend register, a divisor receiving device, mechanism for entering numeral values into said receiving device, a quotient register, actuating means therefore, and means operable concurrently with the operation of said actuating means to reduce the dividend by a corresponding multiple of the divisor to a positive or negative remainder; the combination of, a series of selectively settable primary quotient elements and a series of selectively settable secondary quotient elements alternatively operable to control said quotient register actuating means and cause registration of a digit of the quotient of the dividend or dividend remainder, or the complement of the dividend remainder, respectively, divided by the divisor, and a quotient estimating mechanism including, a primary estimator operable under control of said receiving device and said dividend register to compare the divisor with the dividend or dividend remainder and selectively set one of said series of primary quotient elements corresponding to the estimated quotient digit, and a secondary estimator operable under the joint control of said receiving device and said dividend register to compare the divisor with the complement of the remainder and selectively set one of said series of secondary quotient elements corresponding to the quotient digit of said complement and the divisor, with sign determining mechanism for sensing the sign character of the value in said dividend register and operable under control of said register when the sign of the registration therein is plus to render said primary series of quotient elements effective to control said quotient register actuating means, and when said sign is minus, to render said secondary series of quotient elements effective to control said quotient register actuating means.

References Cited in the file of this patent

UNITED STATES PATENTS

| Number | Name | Date |
|---|---|---|
| 2,211,225 | Avery | Aug. 13, 1940 |
| 2,236,794 | Furber | Apr. 1, 1941 |
| 2,237,150 | Kolm | Apr. 1, 1941 |
| 2,339,616 | Chase | Jan. 18, 1944 |
| 2,343,273 | Avery | Mar. 7, 1944 |
| 2,467,419 | Avery | Apr. 19, 1949 |
| 2,567,120 | Nolde | Sept. 4, 1951 |